(12) United States Patent
Yilbas et al.

(10) Patent No.: US 9,708,225 B2
(45) Date of Patent: Jul. 18, 2017

(54) LASER ABLATION METHOD FOR TREATING A ZIRCONIA CONTAINING CERAMIC SURFACE

(71) Applicant: KING FAHD UNIVERSITY OF PETROLEUM AND MINERALS, Dhahran (SA)

(72) Inventors: Bekir Sami Yilbas, Dhahran (SA); Haider Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/943,842

(22) Filed: Nov. 17, 2015

(65) Prior Publication Data

US 2017/0137329 A1 May 18, 2017

(51) Int. Cl.
| | |
|---|---|
| *C04B 41/00* | (2006.01) |
| *B28B 11/04* | (2006.01) |
| *C04B 35/48* | (2006.01) |
| *C04B 41/50* | (2006.01) |

(Continued)

(52) U.S. Cl.
CPC ...... *C04B 41/0036* (2013.01); *B23K 26/0006* (2013.01); *B23K 26/0066* (2013.01); *B23K 26/14* (2013.01); *B23K 26/352* (2015.10); *B28B 11/04* (2013.01); *C04B 35/48* (2013.01); *C04B 41/4556* (2013.01); *C04B 41/5062* (2013.01);

(Continued)

(58) Field of Classification Search
CPC . C04B 41/0036; C04B 35/48; C04B 41/4556; C04B 41/5062; C04B 2235/3246; C04B 2237/36; C04B 2237/52; C04B 2237/64; B23K 26/352; B23K 26/0006; B23K 26/0066; B23K 26/14;

(Continued)

(56) References Cited

U.S. PATENT DOCUMENTS

| 8,613,983 B2 | 12/2013 | Yilbas et al. |
| 2011/0086204 A1* | 4/2011 | Wohl, Jr. ......... B23K 26/0081 428/156 |

(Continued)

FOREIGN PATENT DOCUMENTS

CN 101992184 A * 3/2011

OTHER PUBLICATIONS

Kathuria, Y.P., "Laser Surface Nitriding of Yttria Stabilized Tetragonal Zirconia", 2007, Surface & Coatings Technology, 201, pp. 5865-5869.*

(Continued)

*Primary Examiner* — Katherine A Bareford
*Assistant Examiner* — Christina McClure
(74) *Attorney, Agent, or Firm* — Oblon, McClelland, Maier & Neustadt, L.L.P.

(57) ABSTRACT

A method of treating a ceramic surface containing zirconia, whereby the ceramic surface is ablated by directing a laser beam with a diameter of 200-400 μm produced by a $CO_2$ laser with a pulse frequency of 1200-1800 Hz onto the ceramic surface, and a $N_2$ assist gas is concurrently applied with a pressure of 550-650 KPa co-axially with the laser beam to form an ablated ceramic surface comprising microgrooves with ZrN present on a surface of the microgrooves, wherein the ablated ceramic surface has a higher surface hydrophobicity than the ceramic surface prior to the ablating.

20 Claims, 16 Drawing Sheets

Laser Treated Surface
Relatively Low Roughness

(51) Int. Cl.
  *C04B 41/45* (2006.01)
  *B23K 26/00* (2014.01)
  *B23K 26/352* (2014.01)
  *B23K 26/14* (2014.01)
  *C23C 4/18* (2006.01)
  *C23C 4/11* (2016.01)
  *B23K 103/00* (2006.01)

(52) U.S. Cl.
  CPC .. *B23K 2203/52* (2015.10); *C04B 2235/3246* (2013.01); *C04B 2237/36* (2013.01); *C04B 2237/52* (2013.01); *C04B 2237/64* (2013.01); *C23C 4/11* (2016.01); *C23C 4/18* (2013.01)

(58) Field of Classification Search
  CPC ....... B23K 2203/52; B28B 11/04; C23C 4/11; C23C 4/18
  USPC .......................................................... 427/554
  See application file for complete search history.

(56) References Cited

U.S. PATENT DOCUMENTS

2013/0209951 A1\* 8/2013 Piascik ................ A61C 8/0015
  433/8
2014/0065368 A1\* 3/2014 Aytug .................... B32B 33/00
  428/142

OTHER PUBLICATIONS

Yilbas, B.S., "Laser Texturing of Zirconia Surface with Presence of TiC and B4C: Surface Hydrophobicity, Metallurgical, and Mechanical Characteristics", 2014, Ceramics International, 40, p. 16159-16167.\*

Cao, CN 101992184 A, Machine Translation, Originally Published 2011, p. 1-9.\*

\* cited by examiner

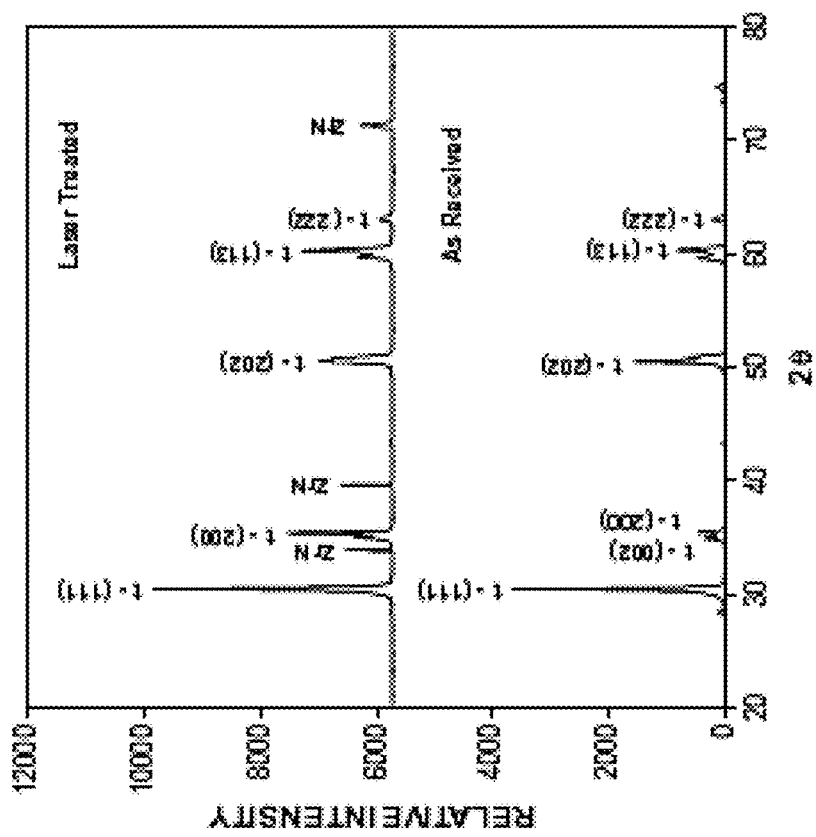

LASER ABLATION METHOD FOR TREATING A ZIRCONIA CONTAINING CERAMIC SURFACE

STATEMENT OF ACKNOWLEDGEMENT

This project was funded by King Fahd University of Petroleum & Minerals under project number MIT11111-11112 and King Abdul-Aziz City of Science and Technology under project number 11-ADV2134-04.

BACKGROUND OF THE INVENTION

Technical Field

The present invention relates to a method of treating a zirconia containing ceramic surface using laser ablation and application of a $N_2$ assist gas.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Stabilized zirconia is widely used in industry due its superior properties such as high wear and temperature resistances, and low thermal conductivity. Some applications of stabilized zirconia include thermal barrier coating in jet and diesel engines to allow operation at higher temperatures, sensor technologies for oxygen sensing, and fuel cell membranes operating at high temperatures. See D. S. Almeida, C. A. A. Cairo, C. R. M. Silva, M. C. A. Nono, Thermal barrier coating by electron beam-physical vapor deposition of zirconia co-doped with yttria and niobia, J. Aerosp. Technol. Manag., São José dos Campos 2 (2)(2010) 195-202; B. Benammar, Design and assembly of miniature zirconia oxygen sensors, IEEE Sens. J. 4 (1) (2004) 3-8, and V. S. Silva, B. Ruffmann, H. Silva, V. B. Silva, A. Mendes, L M. Madeira, S. Nunes, Zirconium oxide hybrid membranes for direct methanol fuel cells-evaluation of transport properties, J. Membr. Sci, 284 (1-2) (2006) 137-144, each incorporated herein by reference in their entirety. The surface characteristics of stabilized zirconia, including hardness and hydrophobicity, can be improved further through various surface treatment methods. Since biomimetic characteristics of surfaces received great attention in industry, various methods have been developed in this regard. Some of these methods include phase separation, electrochemical deposition, template method, emulsion, plasma method, crystallization control, chemical vapor deposition, sol-gel processing, lithography, electrospinning, and solution immersion. See J. T. Han, X. R. Xu, K. W. Cho, Diverse access to artificial superhydrophobic surfaces using block co-polymers, Langmuir 21 (15) (2005) 6662-6665; N. J. Shirtcliffe, G. McHale, M. I. Newton, G. Chabrol, C. C. Perry, Dual-scale roughness produces unusually water-repellent surfaces. Adv. Mater. 16 (21) (2004) 1929-1932; H. S. Hwang, S. B. Lee, I. Park, Fabrication of Raspberry-Like superhydrophobic hollow silica particles. Mater, Lett. 64 (201 (2010) 2159-2162; T. Yang, H. Tian, Y. Chen, Preparation of superhydrophobic silica films with honeycomb-like structure by emulsion method, J. Sol-Gel Sci. Technol. 49 (2) (2009) 243-246; H. Kinoshita, A. Ogasahara, Y. Fukuda, N. Ohmae, Superhydrophobic/superhydrophilic micropatterning on a carbon nanotube film using a laser plasma-type Hyperthermal atom beam facility, Carbon 48 (15) (2010) 4403-4408; Z. G. Guo, J. Fang, J. C. Hao, Y. M. Liang, W. M. Liu, A novel approach to stable superhydrophobic surfaces, Chem. Phys. Chem. 7 (8) (2006) 1674-1677; K. K. Lau, J. Bico, K. B. K. Teo, M. Chhowalla, G. A. J. Amaratung, W. I. Milne, G. H. McKinley, K. K. Gleason, Superhydrophobic carbon nanotube forests, Nano Lett. 3 (12) (2003) 1701-1705; S. S. Latthe, H. Imai, V. Ganesan, A. V. Rao, Super-hydrophobic silica films by sol-gel co-precursor method, Appl. Surf. Sci. 256 (1) (2009) 217-222; R. Furstner, W. Barthlott, C. Neinhuis, P. Walzel, Welting and self-cleaning properties of artificial superhydrophobic surfaces, Langmuir 21 (3) (2005) 956-961; M. Ma, Y. Mao, M. Gupta, K. K. Gleason, G. C. Rutledge, Superhydrophobic fabrics produced by electrospinning and chemical vapor deposition, Macromolecules 38 (23) (2005) 9742-9748; and X. Zhang, Y. Guo, P. Zhang, Z. Wu, Z. Zhang, Superhydrophobic $CuO@Cu_2S$ nanoplate vertical arrays on copper surfaces. Mater. Lett 64 (10) (2010) 1200-1203, each incorporated herein by reference in their entirety. However, transforming low-surface-energy materials into textured surfaces is one of the techniques which can be used to enhance the hydrophobicity of the surfaces. Laser surface texturing through a controlled ablation offers considerable advantages over the conventional texturing methods. Some of these advantages include high speed operation, high precision, local treatment, and low cost. However, the presence of the mixed regime of melting and ablation at the surface modifies the surface texture, which alters the wetting state of the surface. In addition, high stress levels are developed in laser treated region because of the high temperature gradients, which are formed in the irradiated region due to high heating and cooling rates. The fracture toughness of the surface also reduces due to microhardness enhancement at the surface after the treatment process. Consequently, investigation of laser treatment of zirconia surface for improved hydrophobicity and assessment of the residual stress and the fracture toughness in the treated region becomes essential.

Considerable research has been carried out to examine laser treatment of zirconia surfaces. Laser surface treatment of partially stabilized zirconia for biomedical applications was presented by Hao and Lawrence. See L. Hao, J. Lawrence, The adsorption of human serum albumin (HSA) on $CO_2$ laser modified magnesia partially stabilized zirconia (MgO—PSZ). Colloids Surf. B: Biointerfaces 34 (2) (2004) 87-94, incorporated herein by reference in its entirety. They observed that the thickness of the adsorbed human serum albumin decreased as the polar surface energy of the magnesia partially stabilized zirconia increased. Laser treatment of zirconia surfaces was examined by Chwa and Ohmori. See S. O. Chwa, A. Ohmori, The influence of surface roughness of sprayed zirconia coatings on laser treatment. Surf Coat. Technol. 148 (1) (2001) 38-95, incorporated herein by reference in its entirety. They indicated that the surface roughness of zirconia prior to the laser treatment was important, since the melt depth of the polished coatings was approximately half of the rough coatings when treated at the same power density. Laser surface treatment of plasma-sprayed yttria-stabilized zirconia coatings was investigated by Pinto et al. See M. A. Pinto, W. R. Osorio, C. R. P. Lima, A. Garcia, M. C. F. Ierardi, Laser surface treatment of plasma-sprayed yttria-stabilized zirconia coatings, Revista de Metalurgia (Madrid), Spec. (2005) 154-159, incorporated herein by reference in its entirety. They showed that the microstructure of the treated layer presented a cellular structure which grew perpendicular to the surface and the micrographs depicted small cracks and the absence of pores. Laser surface nitriding of yttria stabilized tetragonal zirconia was studied by Kathuria. See Y. P. Kathuria, Laser surface nitriding of yttria stabilized tetragonal zirconia, Surf. Coat. Technol. 201 (12) (2007) 5865-5869, incorporated herein by reference in its entirety. The findings revealed that the transformation of the t-$ZrO_2$ exhibited the typical yellow-gold color of ZrN with high hardness at the surface. Laser surface modification of plasma sprayed yttria stabilized zirconia coatings was examined by Shankar and Mudali. See A. R. Shankar, U. K. Mudali, Laser surface modification of plasma sprayed yttria stabilized zirconia coatings on type 316L stainless steel, Surf. Eng. 25 (3) (2009) 241-248, incorporated herein by reference in its entirety. They observed that a distinct interface separating fine and coarse grains took place at all scan speeds and the microhardness of the glazed surface improved considerably. Laser treatment of a zirconia surface and morphological and microstructural changes in the treated layer was investigated by Daniel et al. See C. Daniel, B. L. Armstrong, B J. Y. Howe, N. B. Dahotre, Controlled evolution of morphology and microstructure in laser interference-structured zirconia, J. Am. Ceram. Soc. 91 (7) (2008) 2138-2142, incorporated herein by reference in its entirety. They showed that the surface morphology closely followed the microperiodic heat treatment provided by the interfering laser beams and the pore size distribution within the periodic surface morphology ranged from a few nanometers to a maximum of half of the periodic line distances. Laser ablation characteristics of yttria-doped zirconia in nanosecond and femtosecond regimes were studied by Heiroth et al. See S. Heiroth, J. Koch, T. Lippert, A. Wokaun, D. Gunther, F. Garrelie, M. Guillermin, Laser ablation characteristics of yttria-doped zirconia in the nanosecond and femtosecond regimes, J. Appl. Phys. 107 (1) (2010) 014908-014918, incorporated herein by reference in its entirety. They showed that femtosecond pulses prevented the exfoliation of micron-sized fragments, but result invariably in a pronounced ejection of submicron particles. Thermal fatigue properties of laser treated surfaces were investigated by Aqida et al. See S. N. Aqida, F. Calosso, D. Brabazon, S. Naher, M. Rosso, Thermal fatigue properties of laser treated steels. Int. J. Mater. Form. 3 (Supp. 1) (2010) 797-800, incorporated herein by reference in its entirety. They observed that carbide and oxide compounds were formed on the laser treated surface after the thermal fatigue test. Thermal stability of laser treated die material for semi-solid metal forming was examined by Aqida et al. See S. N. Aqida, M. Maurel, D. Brabazon, S. Naher, M. Rosso, Thermal stability of laser treated die material for semi-solid metal forming. Int. J. Mater. Form. 2 (Suppl. 1) 2009) 761-764, incorporated herein by reference in its entirety. The findings revealed that crystallization in the glazed zone increased as the annealing temperature increased and the micro-hardness decreased due to local crystallization at the surface.

Hydrophobicity of the substrate surfaces can be improved through forming fine poles at the surface during laser texturing. See B. S. Yilbas, M. Khaled, N. Abu-Dheir, N. Ageeli, S. Z. Furquan, Laser texturing of alumina surface for improved hydrophobicity, Appl. Surf. Sci. 286 (2013) 161-170, incorporated herein by reference in its entirety. Modification of wetting properties of laser-textured surfaces was studied by Bayer et al. See I. S. Bayer, F. Brandi, R. Cingolani, A. Athanassiuu, Modification of wetting properties of laser-textured surfaces by depositing triboelectrically charged Teflon particles, Colloid Polym. Sci. 291 (2) (2013) 367-373, incorporated herein by reference in its entirety. They showed that superhydrophobic surfaces could be achieved through Teflon deposition at the laser textured surface. Bacterial retention on superhydrophobic laser ablated titanium surfaces was investigated by Fadeeva et al. See E. Fadeeva, V. K. Truong, M. Stiesch, B. N. Chichkov, R. J. Crawford, J. Wang, E. P. Ivanova, Bacterial retention on superhydrophobic titanium surfaces fabricated by femtosecond laser ablation, Langmuir 27 (6) (2011) 3012-3019, incorporated herein by reference in its entirety. They indicated that the untreated surface was hydrophobic, whereas the laser-treated surface became superhydrophobic and the attached bacterial cells were found to be below the estimated lower limit. Laser patterning of steel surfaces for improved hydrophobicity was examined by Luo et al. See B. H. Luo, P. W. Shum, Z. F. Zhou, K. Y. Li, Preparation of hydrophobic surface on steel by patterning using laser ablation process, Surf. Coat. Technol. 204 (2010) 1180-1185, incorporated herein by reference in its entirety. They showed that when the laser produced pattern was set at 25 μm spacing, the contact angle of the surface could be increased to about 130°, compared to the 68.5° corresponding to a plain smooth steel surface with Ra≤0.01 μm.

The surface energy of zirconia can be modified by a laser heating at the surface, which may further improve surface hydrophobicity. See S. Norouzian, M. M. Larijani, R. Afzalzadeh, Effect of nitrogen flow ratio on structure and properties of zirconium nitride films on Si(100) prepared by ion beam sputtering, Bull. Mater Sci. 35 (5) (2012) 885-887, incorporated herein by reference in its entirety. Although laser treatment of zirconia surfaces has been examined previously, modifying and investigating the surface hydrophobicity has not been reported. See B. S. Yilbas, S. S. Akhtar, A. Matthews, C. Karatas, Laser remelting of zirconia surface: investigation into stress field and microstructures. Mater. Manuf. Process, 26 (10) (2011) 1277-1287; and B. S. Yilbas, S. S. Aktar, C. Karatas, Laser controlled melting of pre-treated zirconia surface, Appl. Surf. Sci. 257 (15) (2011) 6912-6918, each incorporated herein by reference in their entirety.

In view of the forgoing, the objective of the present invention is to provide a method of treating a zirconia containing ceramic surface using laser ablation and application of a $N_2$ assist gas to increase surface hydrophobicity.

BRIEF SUMMARY OF THE INVENTION

According to a first aspect, the present disclosure relates to a method of treating a ceramic surface comprising zirconia, the method includes i) ablating the ceramic surface by directing a laser beam with a diameter of 200-400 μm produced by a $CO_2$ laser with a pulse frequency of 1200-1800 Hz onto the ceramic surface and ii) concurrently exposing the ceramic surface to a $N_2$ assist gas with a pressure of 550-650 KPa to form an ablated ceramic surface comprising microgrooves with ZrN present on a surface of the microgrooves, wherein the $N_2$ assist gas and the laser beam are oriented co-axially, and wherein the ablated ceramic surface has a higher surface hydrophobicity than the ceramic surface prior to the ablating.

In one embodiment, the ceramic surface comprises yttria stabilized zirconia.

In one embodiment, the ceramic surface is ablated with a laser beam having a power ranging from 1.5-2.5 kW.

In one embodiment, the ceramic surface is ablated with a laser beam with a scanning speed ranging from 7-13 cm·$s^{-1}$.

In one embodiment, the ceramic surface is ablated with a laser beam penetration depth of 3-8 μm.

In one embodiment, the ablated ceramic surface has a surface roughness ranging from 0.25-0.35 µm when measured on a 1 µm×1 µm area.

In one embodiment, the microgrooves have an average width of 40-60 µm and an average distance between the microgrooves is 20-30 µm.

In one embodiment, the ablated ceramic surface has a surface energy of 40-55 mJ/m$^2$.

In one embodiment, the ablated ceramic surface has an average water droplet contact angle of 98-130°.

In one embodiment, the method increases the surface hydrophobicity of the ceramic surface by at least 100% relative to a ceramic surface that is not treated by the ablating and the concurrently exposing as measured by an average water droplet contact angle.

In one embodiment, the ablated ceramic surface has an average glycerol droplet contact angle of 93-120°.

In one embodiment, the ablated ceramic surface has an average diiodomethane droplet contact angle of 35-45°.

In one embodiment, the ablated ceramic surface has a Vickers hardness of 16-23 GPa.

In one embodiment, the ablated ceramic surface has a residual stress of −2 to −1 GPa.

In one embodiment, the ablated ceramic surface has a fracture toughness of 6.5-9.0 MPa·√m In one embodiment, the ceramic surface is not pretreated with hard particles, a film, a resin, nanostructures, or any combination thereof prior to the ablating.

In one embodiment, the method further comprises coating the ablated ceramic surface with a hydrophobic layer to form a superhydrophobic ceramic surface.

In one embodiment, the hydrophobic layer comprises at least one selected from the group consisting of a fluorocarbon, a perfluorocarbon, a resin, a hydrophobic fatty acid, and a hydrophobic self-assembled monolayer.

According to a second aspect, the present disclosure relates to a method of treating a yttria stabilized zirconia surface involving i) ablating the yttria stabilized zirconia surface by directing a laser beam produced by a laser with a pulse frequency of 1200-1800 Hz onto the yttria stabilized zirconia surface and ii) concurrently exposing the yttria stabilized zirconia surface to a N$_2$ assist gas with a pressure of 550-650 KPa to form an ablated yttria stabilized zirconia surface comprising microgrooves with ZrN present on a surface of the microgrooves, wherein the N$_2$ assist gas and the laser beam are oriented co-axially, and wherein the ablated yttria stabilized zirconia surface has a surface hydrophobicity that is at least 100% higher than a yttria stabilized zirconia surface that is not treated by the ablating and the concurrently exposing as measured by an average water droplet contact angle.

According to a third aspect, the present disclosure relates to a method of treating a yttria stabilized zirconia surface, involving i) ablating the yttria stabilized zirconia surface by directing a laser beam produced by a CO$_2$ laser with a pulse frequency of 1200-1800 Hz onto the yttria stabilized zirconia surface and ii) concurrently exposing the yttria stabilized zirconia surface to a N$_2$ assist gas with a pressure of 550-650 KPa to form an ablated yttria stabilized zirconia surface comprising microgrooves with ZrN present on a surface of the microgrooves, wherein the N$_2$ assist gas and the laser beam are oriented co-axially, wherein the ablated yttria stabilized zirconia surface has a higher surface hydrophobicity than the yttria stabilized zirconia surface, and wherein the yttria stabilized zirconia is not pretreated with hard particles, a film, a resin, nanostructures, or any combination thereof prior to the ablating.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A is a X-ray diffractogram of a laser treated surface.

FIG. 5B is a X-ray diffractogram of an as received surface.

DETAILED DESCRIPTION OF THE EMBODIMENTS

Figure 1:
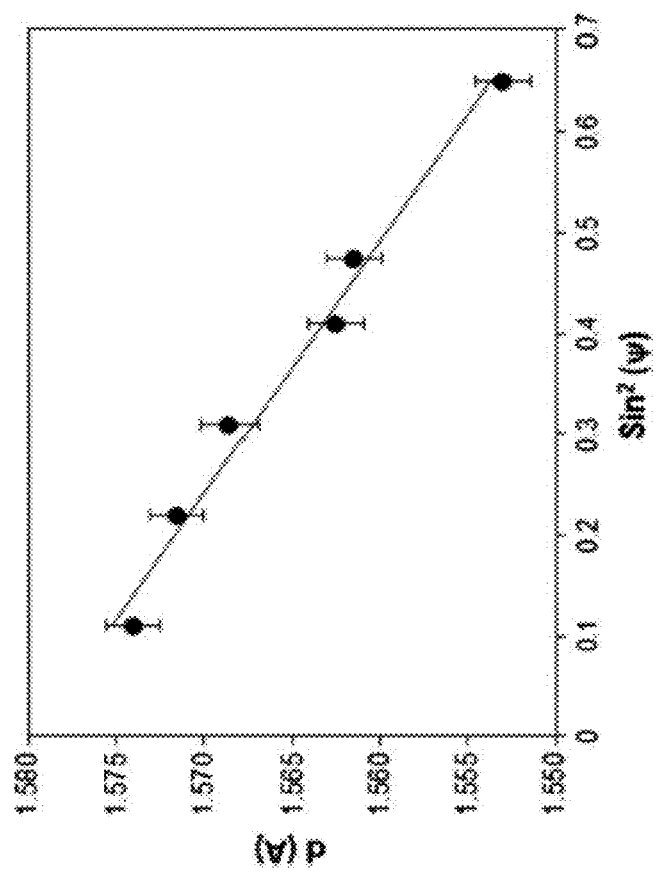
FIG. 1 is a graph of the Linear dependence of d(113) on sin$^2$ψ.
Figure 2A:
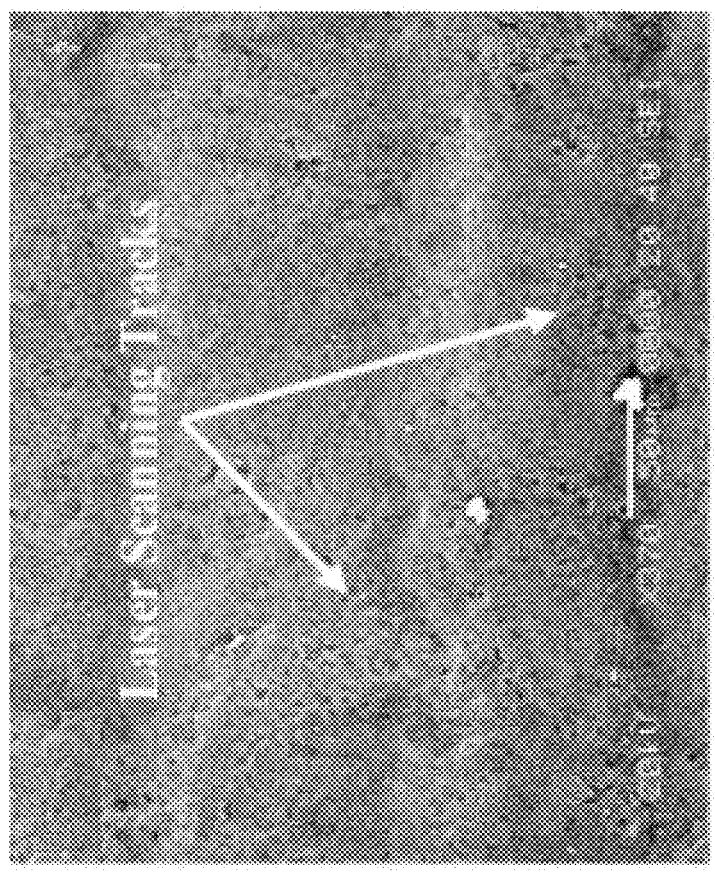
FIG. 2A is a SEM micrograph of a laser treated surface and the presence of scanning tracks.
Figure 2B:
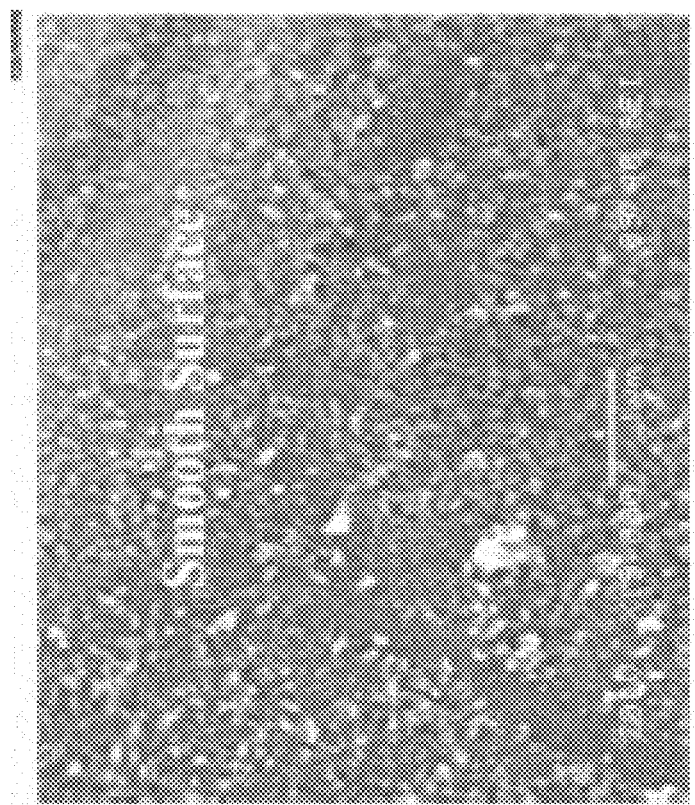
FIG. 2B is a SEM micrograph of a laser treated smooth surface.
Figure 2C:
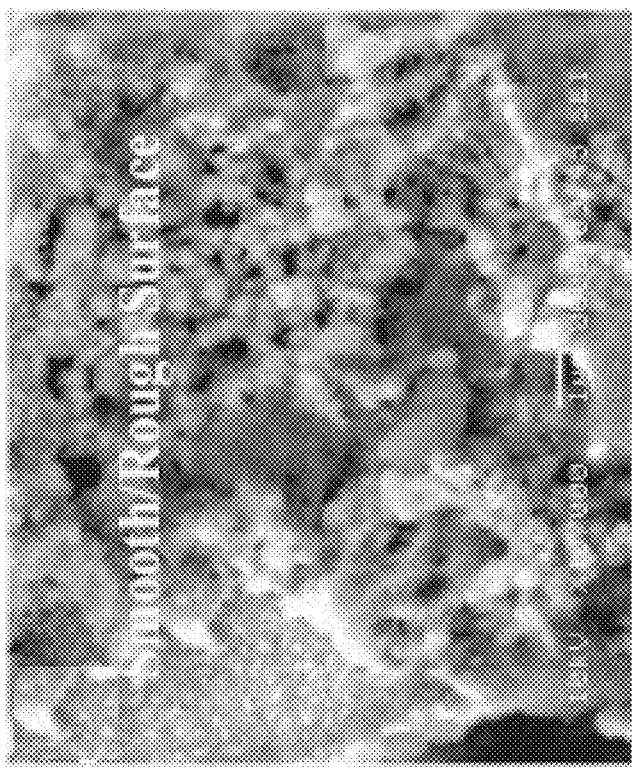
FIG. 2C is a SEM micrograph of a mixture of smooth and rough structures at a laser treated surface.
Figure 2D:
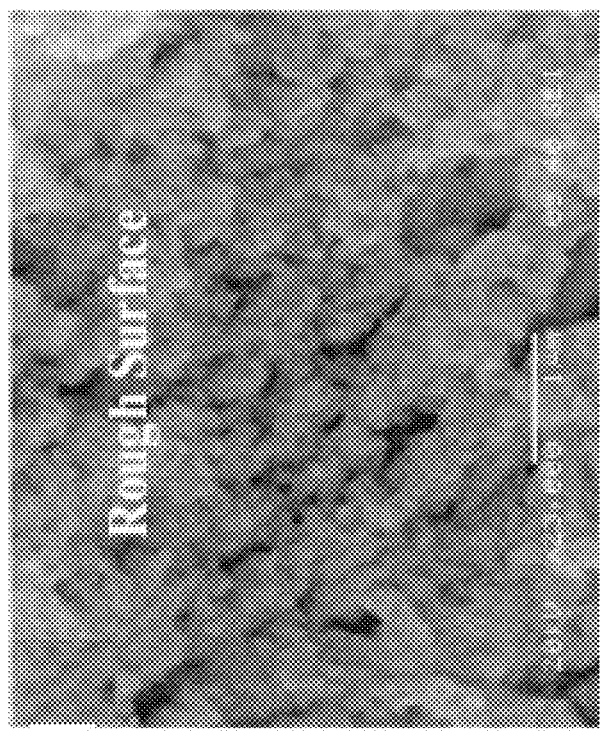
FIG. 2D is a SEM micrograph of a laser treated rough surface.

Referring now to the drawings.

According to a first aspect, the present disclosure relates to a method of treating a ceramic surface comprising zirconia, the method includes ablating the ceramic surface by directing a laser beam produced by a CO$_2$ laser onto the ceramic surface.

Zirconia is a crystalline oxide of zirconium, and may be in the form of three phases including monocyclic, tetragonal, and cubic phases. Zirconia adopts a monoclinic crystal structure at room temperature and transitions to tetragonal and cubic at higher temperatures. The volume expansion caused by the cubic to tetragonal to monoclinic transformation induces large stresses, and these stresses cause zirconia to crack upon cooling from high temperatures. The zirconia in the present disclosure may be in any phase (i.e. monocyclic, tetragonal, cubic phases, or mixtures thereof). When zirconia is blended with other oxides, the tetragonal and/or cubic phases are stabilized. Several different types of stabilized zirconia exist such as partly stabilized zirconia, tetragonal zirconia polycrystal, yttria stabilized zirconia (which contains about 4 mol % yttria for partially stabilized zirconia or about 8 mol % yttria for fully stabilized zirconia), fully stabilized zirconia, and cubic stabilized zirconia. In one embodiment, the ceramic surface comprises yttria stabilized zirconia. In one embodiment, the yttria stabilized zirconia is partially stabilized zirconia, and comprises up to 5 mol % yttria, up to 4.5 mol % yttria, up to 4.4 mol % yttria, up to 4.3 mol % yttria, up to 4.2 mol % yttria, up to 4.1 mol % yttria, up to 4.0 mol % yttria, and at least 96 mol % zirconia, at least 97 mol % zirconia, at least 98 mol % zirconia, at least 99 mol % zirconia, at least 99.5 mol % zirconia, relative to the total moles of the yttria stabilized zirconia. In another embodiment, the yttria stabilized zirconia is fully stabilized zirconia, and comprises greater than about 5 mol % and up to 15 mol % yttria, greater than 5.5 mol % and up to 14 mol % yttria, greater than 6 mol % and up to 13 mol % yttria, greater than 6.5 mol % and up to 12 mol % yttria, greater than 7 mol % and up to 11 mol % yttria, greater than 7.5 mol % and up to 10 mol % yttria, and at least 85 mol % zirconia, at least 90 mol % zirconia, at least 91 mol % zirconia, at least 92 mol % zirconia, at least 93 mol % zirconia, at least 94 mol % zirconia, at least 95 mol % zirconia. In addition to yttria and zirconia, other metals may be present in the yttria stabilized zirconia, in either metallic or metal oxide form, and these other metals are present in less than 5 mol %, preferably less than 4 mol %, preferably less than 3 mol %, preferably less than 2 mol %, preferably less than 1 mol %, preferably less than 0.5 mol %, relative to the total moles of yttria, zirconia, and sum of the other metals. Exemplary other metals that may be present in the yttria stabilized zirconia ceramic surface include Ni, Ga, La, Si, Ti, Mg, Mn, Ca, Ce, Al, Hf, Fe, Cu, Ag, Au, Pt, Zn, Bi, Sb, V, Cr, Mo, Cd, Sn, and the like.

In the present disclosure, the method for manufacturing the yttria stabilized zirconia is non-limiting, and the ceramic surface comprising yttria stabilized zirconia may be manufactured by a variety of methods including, plasma spray, dipping or solution immersion, sintering, phase separation, electrochemical deposition, templating methods, emulsion, crystallization control, chemical vapor deposition, sol-gel processing, lithography, electrospinning, etc. Further, a "substrate" which is defined as any material/object that is to be treated using the method or methods described herein, may be made of any material (e.g. a metal, a ceramic, a plastic, a fibrous material, etc.) so long as a surface of the substrate comprises a ceramic material. Therefore, the substrate in its entirety does not need to be made of a ceramic material (e.g. yttria stabilized zirconia), only a surface portion of the substrate needs to comprise ceramic comprising zirconia. For example, the substrate may be a plastic material that is coated with the ceramic surface (e.g. by a plasma sprayed manufacturing method) or alternatively the substrate may be a metal material (e.g. Hastelloy) that is coated with the ceramic surface (e.g. by a sintering process). Further, the substrate may be any of Si, Ge, GaAs, InP, GaN, $SrTiO_3$, $LaAlO_3$, MgO, sapphire, nickel, copper, silver, or alloys or combinations thereof. The ceramic surface comprising zirconium may substantially cover the substrate, whereby the % surface area coverage of the substrate that is coated with the ceramic material is at least 75%, at least 80%, at least 85%, at least 90%, at least 95%, at least 96%, at least 97%, at least 98%, at least 99%. In some cases, the ceramic surface may incompletely cover, or only cover portions of the substrate, whereby the % surface area coverage of the substrate that is coated with the ceramic material is less than 75%, less than 65%, less than 60%, less than 55%, less than 50%, less than 45%, less than 40%, less than 35%, less than 30%, less than 25%, less than 20%, less than 15%, less than 10%. In some cases, the entire substrate and therefore the surface of the substrate is made of a ceramic material, for example yttria stabilized zirconia.

Ceramic materials, advantageously a ceramic material with high wear resistance, high temperature resistance, low thermal conductivity, and a high hydrophobicity, may be desirable for a variety of applications, for example thermal barrier coatings in jet and diesel engine components, sensor technologies (e.g. oxygen sensing), fuel cell membranes operating at high temperatures, dental restorations such as crowns and bridges, cutlery, as a refractory material in insulation, abrasives, and enamels, and the like.

In addition to yttria, other materials that can be used to stabilize the zirconia present in the ceramic surface include, but are not limited to calcia, magnesia, ceria, hafnia, alumina, lead, titanate, silicate, and carbon.

The method of the present disclosure includes ablating the ceramic surface by directing a laser beam produced by a laser onto the ceramic surface. Laser ablation is the process of removing material from a solid surface by irradiating it with a laser beam. At low laser flux, the material is heated by the absorbed laser energy and evaporates, sublimates or is otherwise separated from the surface by exposure to laser energy, preferably in the presence of a gas flow. At high laser flux, the material is typically converted to a plasma. Usually, laser ablation refers to removing material with a pulsed laser. Laser energy can be selectively absorbed by coatings, particularly on metal, and therefore $CO_2$ or Nd:YAG pulsed lasers can be used to clean surfaces, or prepare surfaces for an application without damaging the underlying surface. Etching or ablating a surface (e.g. the ceramic surface) with a laser is a technique that has many advantageous, including high speed operation, high precision, local treatment, and low cost. A laser differs from other sources of light because lasers emit light coherently. Spatial coherence allows a laser to be focused to a tight spot, and also allows a laser beam to stay narrow over long distances. The beam provides a concentrated heat source, allowing for narrow, deep etchings and high rates. Types of lasers that can be used for ablating the ceramic surface in the present disclosure include helium-neon lasers, argon lasers, krypton lasers, xenon ion lasers, nitrogen lasers, carbon dioxide ($CO_2$) lasers, carbon monoxide lasers, excimer lasers, hydrogen fluoride lasers, deuterium fluoride lasers, chemical oxygen-iodine lasers, all gas-phase iodine lasers, dye lasers, ruby lasers, yttrium-aluminum-garnet(YAG) lasers (e.g. YAG and any of Nd, Cr, Er, Y, Ca, glass, Th, Yb, Ho), and the like, so long as the laser can be used in conjunction with a $N_2$ assist gas. In a preferred embodiment, the ceramic surface is ablated by directing a laser beam produced by a $CO_2$ laser onto the ceramic surface. In one embodiment, the $CO_2$ laser produces a laser beam of infrared light having an operation wavelength of 8.0-12 µm, preferably 8.5-11.5 µm, preferably 9.0-11.0 µm, preferably 9.4-10.6 µm. In one embodiment, the $CO_2$ laser is powered by a traverse pump (high power). In an alternative embodiment, the $CO_2$ laser is powered by a longitudinal electrical discharge pump (low power). The $CO_2$ laser may also have an efficiency rating, as defined by the ratio of output power to pump power, of up to 25%, up to 22%, up to 20%, up to 18%, or up to 16%.

In one embodiment, the $CO_2$ laser comprises a focusing lens with a nominal focal length of 120-131 mm, 121-131 mm, 122-131 mm, 123-131 mm, 124-130 mm, 125-129 mm, 126-128 mm, or about 127 mm.

In one embodiment, the laser beam produced by the $CO_2$ laser has a diameter of at least 200 μm, at least 220 μm, at least 240 μm, at least 260 μm, at least 280 μm, at least 300 μm, and no more than 400 μm, no more than 380 μm, no more than 360 μm, no more than 340 μm, no more than 320 μm, no more than 310 μm. For example, 200-400 μm, preferably 200-300 μm, preferably 210-360 μm, preferably 220-340 μm, preferably 230-320 μm.

In one embodiment, the ablating is performed by directing a laser beam produced by a laser with a pulse frequency of 1200-1800 Hz, preferably 1300-1700 Hz, preferably 1400-1600 Hz, or about 1500 Hz onto the ceramic surface. Pulse frequency is a measure of the number of cycles of emitted light per second, with each cycle of emitted light ("on" time) being separated by intermittent "off" time. Duty indicates the on/off ratio of the laser beam for every one cycle. A higher duty means that the laser has a higher ratio of "on" compared to "off". In the present method, the laser has a duty of 20-90%, 30-80%, 40-70%, or 45-65%.

In one embodiment, the ceramic surface is ablated with a laser beam having a power ranging from 1.5-2.5 kW, preferably 1.6-2.4 kW, preferably 1.7-2.3 kW, preferably 1.8-2.2 kW, preferably 1.9-2.1 kW. In one embodiment, the ceramic surface is ablated with a laser beam with a scanning speed (or "feed rate") ranging from 7-13 cm·s$^{-1}$, preferably 8-12 cm·s$^{-1}$, preferably 9-11 cm·s$^{1}$, or about 10 cm·s$^{-1}$. In one embodiment, the ceramic surface is ablated with a laser beam penetration depth of 3-8 μm, preferably 3.4-7.6 μm, preferably 3.8-7.2 μm, preferably 4.2-6.8 μm, preferably 4.6-6.4 μm, or about 5.0 μm. In one embodiment, the laser beam penetration depth is shallow to form surface with a "low roughness", wherein the laser beam penetration depth is about 3-5 μm, about 4-5 μm, or about 4.5-5 μm. In an alternative embodiment, the laser beam penetration depth is deep to form a surface with a "high roughness", wherein the laser beam, penetration depth is about 5-8 μm, preferably 5-7, preferably 5-6 μm, preferably 5-5.5 μm.

In addition to the ablating, the method of the present disclosure also involves concurrently exposing the ceramic surface to a $N_2$ assist gas to form an ablated ceramic surface comprising microgrooves with ZrN present on a surface of the microgrooves, wherein the $N_2$ assist gas and the laser beam are oriented co-axially. In one embodiment, the ceramic surface is exposed to a $N_2$ assist gas with a pressure of 550-650 KPa, 560-640 KPa, 570-630 KPa, 580-620 KPa, or 590-610 KPa. In one embodiment, the ceramic surface is exposed to a $N_2$ assist gas with a flow rate of 1,500-2,500 L/h, preferably 1,600-2,400 L/h, preferably 1,700-2,300 L/h, preferably 1,800-2,200 L/h, preferably 1,900-2,100 L/h.

In addition to various components common to lasers (e.g. gain medium, high reflector, output coupler, a pump such as a flash lamp, an optical cavity, etc.), the laser used in the present method may have a conical nozzle for applying the $N_2$ assist gas co-axially with the laser beam. Further, other types of laser ablation nozzles having multiple passageways, such as that described in U.S. Pat. No. 5,496,985A, which is incorporated herein by reference in its entirety, can be used in the method described herein.

As used herein, a "nozzle gap" refers to the distance between the tip of the nozzle of the laser and the ceramic surface. When ablating a ceramic surface using a high-pressure assist gas, it is advantageous to use a small nozzle gap as a small nozzle gap uses the assist gas more efficiently. Therefore, in one embodiment, a nozzle gap used for the ablating and the concurrently exposing is 1.1 to 1.9 mm, preferably 1.2 to 1.8 mm, preferably 1.3 to 1.7 mm, preferably 1.4 to 1.6 mm.

In one embodiment, the ablated ceramic surface has a surface roughness ranging from 0.25-0.35 μm, preferably 0.26-0.34 μm, preferably 0.27-0.33 μm, preferably 0.28-0.32 μm, preferably 0.29-0.31 μm when measured on a 1 μm×1 μm area. In one embodiment, the ablated ceramic surface or sections of the ablated ceramic surface have a low surface roughness ranging from about 0.25 to about 0.30 μm. In an alternative embodiment, the ablated ceramic surface or sections of the ablated ceramic surface have a high surface roughness ranging from about 0.30 to about 0.35 μm.

In one embodiment, the microgrooves have an average width of 40-60 μm, 45-55 μm, 48-52 μm, or about 50 μm and an average distance between the microgrooves is 20-30 μm, 21-29 μm, 22-28 μm, 23-27 μm, 24-26 μm, or about 25 μm. Nanogrooves (i.e. grooves having an average width of less than 100 nm) may also be present on the ablated ceramic surface, but the presence of these nanogrooves are rare.

During the treatment process, and depending on the various ablation conditions, such as for example the width of the laser beam and the pulse frequency, the ablating may form ablated/melting tracks at the ablated ceramic surface. In one embodiment 60-90% of ablated/melting tracks are overlapping, preferably 65-85%, preferably 68-80%, preferably 69-76%, preferably 70-74%, preferably 71-73%.

Treating the ceramic surface with the method of the present disclosure may result in the formation of a dense layer at the ceramic surface due to high cooling rates in this region. The dense layer may consist of fine grains and closely spaced fine dendrites forming a feathery-like structure. In this case, the surface layer has a higher density than that of the untreated substrate below the dense layer (i.e. below the laser beam penetration depth). For example, fully stabilized yttria stabilized zirconia (i.e. having about 8 mol % yttria) that is untreated by the ablating described herein has a density of about 6.10 g/cm$^3$. Therefore, in one embodiment, the method forms a dense layer at the ceramic surface having a density of greater than 6.10 g/cm$^3$, preferably greater than 6.20 g/cm$^3$, preferably greater than 6.30 g/cm$^3$, preferably greater than 6.40 g/cm$^3$, preferably greater than 6.50 g/cm$^3$, preferably greater than 6.60 g/cm$^3$, preferably greater than 6.70 g/cm$^3$, preferably greater than 6.80 g/cm$^3$, preferably greater than 6.90 g/cm$^3$, preferably greater than 7.00 g/cm$^3$.

In one embodiment, the ceramic surface comprises tetragonal zirconia (t-$ZrO_2$). The application of the ffullyN$_2$ assist gas to the ceramic surface during the ablating forms ZrN at the ablated ceramic surface following $O_2$ release from the zirconia through a dissociation process. However this $O_2$ dissociation process and formation of ZrN at the ceramic surface results in vacancies in the zirconia, which alters the surface energy (i.e. the surface energy of the ceramic surface is different from the surface energy of the ablated ceramic surface). For example, the surface energy of the ceramic surface (i.e. prior to ablating), which is a fully stabilized yttria stabilized zirconia, is about 55.31 mJ/m$^2$. In one embodiment, the ablated ceramic surface has a surface energy of 40-55 mJ/m$^2$, preferably 41-54 mJ/m$^2$, preferably 42-53 mJ/m$^2$, preferably 43-52 mJ/m$^2$, preferably 44-51 mJ/m$^2$, preferably 45-50 mJ/m$^2$, or about 49.33 mJ/m$^2$.

In one embodiment, the ceramic surface is yttrium stabilized zirconia and the ablated ceramic surface comprises yttrium stabilized zirconia having microgrooves with ZrN present on a surface of the microgrooves. Therefore, in one embodiment, the surface portion of the ablated ceramic surface (the portion which was ablated or in contact with the laser beam and $N_2$ assist gas) comprises 2-8 wt % Y, 1-7 wt % N, 40-55 wt % O, and the balance is Zr, preferably 3-7 wt % Y, 2-6 wt % N, 42-51 wt % O, and the balance is Zr, more preferably 4-6 wt % Y, 3-5 wt % N, 43-47 wt % O, and the balance is Zr.

Surface hydrophobicity is a measure of the wetting properties of a materials' surface and relates to the difficulty or ease by which the surface is wet. In many technology fields and industrial applications, materials with a hydrophobic surface or a superhydrophobic surface are advantageous due to their self-cleaning properties and relative difficulty to wet. One measure for surface hydrophobicity is droplet contact angle with common solvents and/or liquids such as water, glycerol, and diiodomethane. As used herein, the term "hydrophobic" surface generally refers to surfaces which have a contact angle from 90-150° with a drop of water, and the term "superhydrophobic" surface generally refers to surfaces which have a contact angle greater than 150° with a drop of water. In a preferred embodiment, the ablated ceramic surface has a higher surface hydrophobicity than the ceramic surface prior to the ablating. In one embodiment, the contact angle of the ceramic surface and the ablated ceramic surface is determined using a contact angle goniometer.

In one embodiment, the ablated ceramic surface has an average water droplet contact angle of at least 98°, at least 100°, at least 105°, at least 110°, at least 115°, at least 120°, at least 121°, and no more than 130°, no more than 125°, no more than 120°, no more than 115°, no more than 110°, no more than 105°. For example 98-130° or 118-124°. In one embodiment, for ablated ceramic surfaces with a high surface roughness the average water droplet contact angle is 98-110° or 98-100°. In one embodiment, for ablated ceramic surfaces with a low surface roughness the average water droplet contact angle is 115-130° or 120-125°. In one embodiment, the method increases the surface hydrophobicity of the ceramic surface by at least 100%, at least 110%, at least 120%, at least 130% relative to a ceramic surface that is not treated by the ablating and the concurrently exposing as measured by an average water droplet contact angle (i.e. the percent increase in water droplet contact angle from the ceramic surface to the ablated ceramic surface).

In one embodiment, the ablated ceramic surface has an average glycerol droplet contact angle of 93-120°, 95-118°, 100-116°, or 105-115°. In one embodiment, for ablated ceramic surfaces with a high surface roughness the average glycerol droplet contact angle is 93-110° or 93-98°. In one embodiment, for ablated ceramic surfaces with a low surface roughness the average glycerol droplet contact angle is 105-120° or 110-115°. In one embodiment, the method increases the surface hydrophobicity of the ceramic surface by at least 120%, at least 150%, at least 180%, at least 200%, at least 215% relative to a ceramic surface that is not treated by the ablating and the concurrently exposing as measured by an average glycerol droplet contact angle (i.e. the percent increase in glycerol droplet contact angle from the ceramic surface to the ablated ceramic surface).

In one embodiment, the ablated ceramic surface has an average diiodomethane droplet contact angle of 35-45°, 37-44°, or 39-43°. In one embodiment, the method increases the surface hydrophobicity of the ceramic surface by at least 80%, at least 90%, at least 95%, at least 100% relative to a ceramic surface that is not treated by the ablating and the concurrently exposing as measured by an average diiodomethane droplet contact angle (i.e. the percent increase in diiodomethane droplet contact angle from the ceramic surface to the ablated ceramic surface).

In one embodiment, the ablated ceramic surface has a Vickers hardness of 16-23 GPa, preferably 17-22 GPa, preferably 18-21 GPa. In one embodiment, the ablated ceramic surface has a residual stress of −2 to −1 GPa, −1.8 to −1.4 GPa, −1.7 to −1.5 GPa. In one embodiment, the ablated ceramic surface has a fracture toughness of 6.5-9.0 MPa·$\sqrt{m}$, preferably 6.8-8.8 MPa·$\sqrt{m}$, preferably 7.0-8.5 MPa·$\sqrt{m}$.

In one embodiment, the ceramic surface is not pretreated with hard particles, a film, a resin, nanostructures, or any combination thereof prior to the ablating. Therefore, the ceramic surface is directly ablated with the laser beam along with concurrent application of the $N_2$ assist gas. In this respect, in a preferred embodiment, any ZrN present on the ablated ceramic surface is formed the method described herein (i.e. which causes the conversion of tetragonal $ZrO_2$ to ZrN), and not from depositing preformed ZrN onto a surface to be ablated. Exemplary hard particles include TiC, ZrC, WC, $B_4C$, ZrN, TiN, YN, VN, WN, GaN, AlN, HfN, TaN, NbN, InN, $Si_3N_4$, $Zn_3N_2$, or metal particles comprising Sc, Y, La, Ce, Pr, Nd, Pm, Sm, Eu, Gd, Tb, Dy, Ho, Er, Tm, Yb, Lu, Pd, Ta, Zr, Ti, Ir, Hf, Pt, Au, Ni, Zn, Mg, Cu, Al, combinations thereof, and the like. Such hard particles may be nano-sized and therefore may also meet the definition of nanostructures. For example nano-sized hard particles comprising $TiO_2$ and/or $Cu_2O$ are considered nanostructures for the purposes of this disclosure. Exemplary resins and/or films include films or resins made from carbon layers or carbon sheets, phenolic resins, epoxy resins (e.g. bisphenol A and F epoxy resins, glycidylamine epoxy resin, aliphatic epoxy resin, etc.), polystyrene (PS), poly(methylmethacralate), manganese oxide polystyrene ($MnO_2$/PS) nano-composite, zinc oxide polystyrene (ZnO/PS) nano-composite, precipitated calcium carbonate, carbon nanotube structures, silica nano-coating, nanopin film, and the like.

In one embodiment, the method further comprises coating the ablated ceramic surface with a hydrophobic layer to form a superhydrophobic ceramic surface. Adding one or more hydrophobic layers to an already ablated ceramic surface as defined herein may increase the surface contact angle, and therefore the hydrophobicity of the surface.

In one embodiment, the hydrophobic layer comprises at least one selected from the group consisting of a fluorocarbon, a perfluorocarbon, a resin, a hydrophobic fatty acid, and a hydrophobic self-assembled monolayer. Exemplary fluorocarbons and perfluorocarbons include, but are not limited to, i) fluoroalkanes such as carbon tetrafluoride, perfluorooctane, perfluoro-2-methylpentane, perfluorooctanoic acid, perfluoro-1,3-dimethylcyclohexane, perfluorodecalin, hexafluoroethane, perfluoropentane, perfluoromethylcyclohexane, perfluoro-1,3-dimethylcyclohexane, perfluoromethyldecalin, ii) fluoroalkenes/fluoroalkynes such as perfluoroisobutene, tetrafluoroehytlene, hexafluoropropylene, hexafluorobutyne, iii) perfluoroaromatic compounds such as hexafluorobenzene, octafluorotoluene, and octafluoronaphthalene and iv) fluoropolymers such as polyvinylfluoride, polyvinylidene fluoride, polytetrafluoroethylene, polychlorotrifluoroethylene, perfluoroalkoxy polymer, fluorinated ethylene-propylene, polyethylenetetrafluoroethylene, polyethylenetetrafluoroethylene, polyethylenechlorotrifluoroethylene, perfluoropolyether, and perfluoropolyoxetane, and the like.

Exemplary resins that may be applied after the ablating and the concurrently exposing have been mentioned heretofore (e.g. epoxy resins, phenolic resins, etc.).

The hydrophobic fatty acid that may be used to coat the ablated ceramic surface may be selected from the group of propanoic acid, butanoic acid, pentanoic acid, hexanoic acid, heptanoic acid, octanoic acid, nonanoic acid, decanoic acid, undecanoic acid, dodecanoic acid, tridecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, henatriacontanoic acid, dotriacontanoic acid, tritriacontanoic acid, tetratriacontanoic acid, pentatriacontanoic acid, hexatriacontanoic acid, and combinations thereof.

Self-assembled monolayers (SAM) are molecular assemblies formed spontaneously on surfaces by adsorption and are organized into more or less large ordered domains. In some cases molecules that form the monolayer do not interact strongly with the substrate. In other cases the molecules possess a head group that has a strong affinity to the substrate and anchors the molecule to it (e.g. a thiol to a metal or ceramic surface). In one embodiment, the ablated ceramic surface is coated with a hydrophobic layer comprising a self-assembled monolayer. Self-assembled monolayers which may be used in the present method include, but are not limited to, (11-mercaptoundecyl)tetra(ethylene glycol), [11-(methylcarbonylthio)undecyl]tetra(ethylene glycol), tetra(ethylene glycol) dithiol, 1-hexadecanethiol, and the like.

According to a second aspect, the present disclosure relates to a method of treating a yttria stabilized zirconia surface involving i) ablating the yttria stabilized zirconia surface by directing a laser beam produced by a laser with a pulse frequency of 1200-1800 Hz onto the yttria stabilized zirconia surface and ii) concurrently exposing the yttria stabilized zirconia to a $N_2$ assist gas with a pressure of 550-650 KPa to form an ablated yttria stabilized zirconia surface comprising microgrooves with ZrN present on a surface of the microgrooves, wherein the $N_2$ assist gas and the laser beam are oriented co-axially, and wherein the ablated yttria stabilized zirconia surface has a surface hydrophobicity that is at least 100% higher than a yttria stabilized zirconia surface that is not treated by the ablating and the concurrently exposing as measured by an average water droplet contact angle.

According to a third aspect, the present disclosure relates to a method of treating a yttria stabilized zirconia surface, involving i) ablating the yttria stabilized zirconia surface by directing a laser beam produced by a $CO_2$ laser with a pulse frequency of 1200-1800 Hz onto the yttria stabilized zirconia surface and ii) concurrently exposing the yttria stabilized zirconia surface to a $N_2$ assist gas with a pressure of 550-650 KPa to form an ablated yttria stabilized zirconia surface comprising microgrooves with ZrN present on a surface of the microgrooves, wherein the $N_2$ assist gas and the laser beam are oriented co-axially, wherein the ablated yttria stabilized zirconia surface has a higher surface hydrophobicity than the yttria stabilized zirconia surface, and wherein the yttria stabilized zirconia is not pretreated with hard particles, a film, a resin, nanostructures, or any combination thereof prior to the ablating.

The examples below are intended to further illustrate protocols for treating and characterizing ceramic surfaces and are not intended to limit the scope of the claims.

EXAMPLE 1

Experimental

A $CO_2$ laser (LC-ALPHAIII) delivering nominal output power of 2 kW was used to irradiate the workpiece surface. The nominal focal length of the focusing lens was 127 mm. The laser beam diameter focused at the workpiece surface was 0.2 mm. Nitrogen assisting gas emerging from the conical nozzle and co-axially with the laser beam was used. The laser melting parameters are given in Table 1.

TABLE 1

Laser processing parameters.

| Feed rate (m/s) | Power (W) | Frequency (Hz) | Nozzle gap (mm) | Nozzle diameter (mm) | Focus diameter (mm) | $N_2$ pressure (kPa) |
| --- | --- | --- | --- | --- | --- | --- |
| 0.1 | 2000 | 1500 | 1.5 | 1.5 | 0.3 | 600 |

The zirconia tiles 25 mm×15 mm×3 mm were used in the experiments. JEOL JDX-3530 scanning electron microscope (SEM) was used to obtain photomicrographs of the cross-section and surface of the workpieces after the tests. The Bruker D8 Advance having Cu Kα radiation was used for XRD analysis. A typical setting of XRD was 40 kV and 30 mA. It should be noted that the residual stress measured using the XRD technique provided the data in the surface region of the specimens, which was related to the penetration depth of Cu Kα radiation into the treated layer, i.e. the penetration depth was in the order of 5 μm. The measurement relied on the stresses in fine grained polycrystalline structure. The position of the diffraction peak exhibited a shift as the specimen was rotated by an angle $\psi$. The magnitude of the shift was related to the magnitude of the residual stress. The relationship between the peak shift and the residual stress (σ) could be written as:

$$\sigma = \frac{E}{(1+v)\sin^2\psi} \frac{(d_n - d_o)}{d_o} \quad (1)$$

where E is Young's modulus, ν is Poisson's ratio, $\psi$ is the tilt angle, $d_n$ are the d spacing measured at each tilt angle, and $d_o$ is the stress-free lattice spacing. See R. H. U. Khan, A. L. Yerokhin, T. Pilkington, A. Leyland, A. Matthews, Residual stress in plasma electrolytic oxidation coatings on Al alloy produced by pulsed unipolar current, Surf Coat. Technol. 200 (2005) 1580-1586, incorporated herein by reference in its entirety. If there are no shear strains present in the specimen, the d spacing changes linearly with $\sin^2 \psi$. FIG. 1 shows the linear dependence of d(113), in nanometer unit, on $\sin^2 \psi$ in the region of laser treated surface. The $Zr_3O$ peak takes place at 63.106°, which corresponds to (113) plane with the inter-planer spacing of 0.1472 nm. The slope of the curve indicates that the in-phase residual stress is compressive. The XRD experiment for the residual stress measurement was repeated five times at four locations at the laser treated workpiece surface to secure the repeatability of the results. The error related to the measurements is estimated as 3%.

The fracture toughness of the surface was measured using the indenter test data for microhardness (Vickers) and crack inhibiting. In this case, the crack length generated due to indentation at the surface was measured. The length (l) measured corresponded to the distance from the crack tip to the indent. The crack lengths were individually summed to obtain l as described in the previous study. See E. Lopez Cantera, B. G. Mellor, Fracture toughness and crack morphologies in eroded WC-Co—Cr thermally sprayed coatings, Mater. Lett. 37 (1998) 201 210, incorporated herein by reference in its entirety. The crack length "c" from the center of the indent was the sum of individual crack lengths (l) and half the indent diagonal length "2a". Therefore, c=a+l. However, depending upon the ratio of $$\frac{c}{a},$$

various equations were developed to estimate the fracture toughness (K). However, the equation proposed by Anstis et al. has limitations due to nonlinearity of the coefficients for values of $$\frac{c}{a} > 2,$$

which is not appropriate for the silicon carbide (≈1.5-2.1). See G. R. Anstis, P. Chantikul, B. R. Lawin, D. B. Marshall, A critical evaluation of indentation techniques for measuring fracture toughness: I, direct crack measurements, J. Am. Ceram, Soc. 64 (1981) 533-538, incorporated herein by reference in its entirety. Therefore, the equation proposed by Evans and Charles is used to determine the fracture toughness ($K_c$), which is applicable for $$\left(0.6 \leq \frac{c}{a} \leq 4:5\right), \text{ i.e: } K_c = 0.079\left(\frac{P}{a}\right)^{1.5} \cdot \log\left(4.5P\frac{a}{c}\right) \quad (2)$$

where P is the applied load on indenter, c is the crack length, and a is the half indent diagonal length. See A. G. Evans, E. A. Charles, Fracture toughness determinations by indentation. J. Am. Ceram, Soc. 59 (7-8) (1976) 371-372, incorporated herein by reference in its entirety. Table 2 gives the data used for the fracture toughness measurement.

TABLE 2

Microhardness and fracture toughness and data used for fracture toughness calculations.

| | Hardness HV (GPa) | Fracture toughness (MPa √m) | P (N) | a (μm) | c (μm) |
|---|---|---|---|---|---|
| As -received surface | 15.7 ± 0.06 | 9.5 ± 0.4 | 5 | 20 | 50 |
| Laser treated surface | 19.2 ± 0.06 | 7.2 ± 0.4 | 5 | 25 | 50 |

Microphotonics digital microhardness tester (MP-100TC) was used to obtain microhardness at the surface of the nitride layer. The standard test method for Vickers indentation hardness of advanced ceramics (ASTM C1327-99) was adopted and 300 mg load was used during the tests. The measurements were repeated three times at each location.

The wetting experiment was performed using Kyowa (model—DM 501) contact angle goniometer. A static sessile drop method was considered for the contact angle measurement. The water contact angle between the water droplet and the laser treated surface was measured with the fluid medium as de-ionized water. Droplet volume was controlled with an automatic dispensing system having a volume step resolution of 0.1 μl. Still images were captured, and contact angle measurements were performed after one second of deposition of water droplet on the surface. The experiments were repeated three times at different locations at the laser treated and as received surfaces. In order to determine the surface free energy of the laser treated surface contact angle measurements are extended to include glycerol, and diiodomethane. The analysis related to the surface energy formulation is presented in the light of the previous study. See M. L. Gonzalez-Martin, L. Labajos-Broncano, B. Janczuk, J. M. Bruquez, Wettability and surface free energy of zirconia ceramics and their constituents, J. Mater. Sci. 34 (1999) 5923-5926, incorporated herein by reference in its entirety. The surface energy of solids and liquids can be divided into components according to van Oss et al.; in which case, the surface energy can be written as:

$$y = y^L + y^P \quad (3)$$

where $y^L$ is the apolar component due to Lifshitz-van der Waals intermolecular interactions and $y^P$ is due to electron-acceptor and electron donor intermolecular interactions. See C. J. Van Oss, R. J. Good, M. K. Chaudhury, Mechanism of DNA (southern) and protein (western) blotting on cellulose nitrate and other membranes. Chromatography 391 (1987) 53-65; C. J. Van Oss, R. J. Good. H. J. Busscher, Estimation of the polar surface tension parameters of glycerol and formamide for use in contact angle measurements on polar solids, J. Dispersion Sci. Technol. 11 (1990) 75-81; C. J. Van Oss, M. K. Chaudhury, R. J. Good, Interfacial Lifshitz-van der Waals and polar interactions in macroscopic systems, Chem. Rev. 88 (6)(1988) 927-941; and M. Zenkiewicz, Methods for the calculation of surface free energy of solids. J. Achievements Mater. Manuf. Eng. 24 (1) (2007) 137-145, each incorporated herein by reference in their entirety. However, $y^P$ can be written as:

$$y^P = 2\sqrt{y^+ \cdot y^-} \quad (4)$$

where $y^+$ and $y^-$ are the electron acceptor and electron donor parameters of acid-base component of the solid and liquid surface free energy, respectively. The interfacial free energy for a solid-liquid system can be written as:

$$y_{SL} = y_S + y_L - 2\sqrt{y_S^L \cdot y_L^L} - 2\sqrt{y_S^+ \cdot y_L^-} - 2\sqrt{y_S^- \cdot y_L^+} \quad (5)$$

where subscripts S and L represent solid and liquid phases, respectively. However, Young's equation for the surface free energy of a solid is:

$$y_L \cos \theta = y_S - y_{SL} - Pe_L \quad (6)$$

where $y_S$ is the solid surface free energy, $y_{SL}$ is the interfacial solid-liquid free energy, $y_L$ is the liquid surface tension, θ is the contact angle, and $Pe_L$ is the pressure of the liquid film, which is negligibly small and considered to be zero. See A. W. Adamson, Physical Chemistry of surface, fifth ed., Wiley-Interscience. New York, 1991, incorporated herein by reference in its entirety. Combining Eqs. (5) and (6) and re-arrangements yield:

$$y_L(\cos \theta + 1) = 2\sqrt{y_S^L \cdot y_L^L} + 2\sqrt{y_S^+ \cdot y_L^-} + 2\sqrt{y_S^- \cdot y_L^+} \quad (7)$$

Eq. (7) can be used to determine the values of $$y_S^L, y_S^+, \text{ and } y_S^-$$

while incorporating the contact angle data and $$y_L^I, y_L^+, \text{ and } y_L^-.$$

However, the data for $$y_L^I, y_L^+, \text{ and } y_L^-$$

can be found in the open literature for water, glycerol, and diiodomethane, which are given in Table 3. See B. Janczuk, W. Wojcik, A. Zdziennicka. Determination of the components of the surface tension of some liquids from interfacial liquid-liquid tension measurements, J. Colloid Interface Sci. 157 (2) (1993) 384-393, incorporated herein by reference in its entirety. Since Eqs. (7), (4) and (3) are applicable to only smooth surfaces, experiments are repeated at lower power intensity to ensure thin layer of melting in the irradiated region and ZrN formation at the surface. In this case, surface evaporation is avoided and the surface texture was not formed due to ablation. The contact angle measurements are repeated several times to ensure the repeatability of the contact angle data. The measurements revealed the following contact angles for the laser treated smooth surfaces: for water θ=63°; for glycerol θ=50.2°; for diiodomethane θ=20.5°. Using Eqs. (3) and (4), the data calculated are given in Table 4 for the surface free energy of the laser treated smooth surfaces. The surface energy determined using Eqs. (7), (4) and (3) yields 49.33 mJ/m², which is slightly less than those reported in the previous study (52.6 mJ/m²) for ZrN. See C.-C. Sun, S.-H. Lee, W.-C. Hwang, J.-S. Hwang, I-T, Tang, Y.-S. Fu, Surface free energy of alloy nitride coatings deposited using closed field unbalanced magnetron sputter ion plating, Mater. Trans. 47 (10) (2006) 2533-2539, incorporated herein by reference in its entirety. Moreover, the contact angle measurements were repeated for the as received samples and the following contact angles are resulted: for water θ=51.1°; for glycerol θ=36.2°: for diiodomethane θ=20.5°. Using Eqs. (7), (4) and (3), and the data given in Table 3 for water, glycerol, and diiodomethane, the data obtained is given in Table 5 and the surface free energy is estimated as 55.3 mJ/m². The measured value is in agreement with data reported in the previous study, which is 56.1 mJ/m². See A. Noro, M. Kaneko. I. Murata. M. Yoshinari, Influence of surface topography and surface physicochemistry on wettability of zirconia (tetragonal zirconia polycrystal), J. Biomed. Mater. Res. B: Appl. Biomater. 00B (2012) 1-9, incorporated herein by reference in its entirety.

TABLE 3

Lifshitz-van der Walls components and electron-donor parameters used in the simulation.

| | $\gamma_L$ (mJ/m²) | $\gamma_L^L$ (mJ/m²) | $\gamma_L^+$ (mJ/m²) | $\gamma_L^-$ (mJ/m²) |
|---|---|---|---|---|
| Water | 72.8 | 21.8 | 25.5 | 25.5 |
| Glycerol | 64 | 34 | 3.92 | 57.4 |
| Diiodomethane | 50.8 | 50.8 | 0.72 | 0 |

TABLE 4

Lifshitz-van der Walls components electron-donor parameters determined for laser treated smooth surface.

| $\gamma_S$ (mJ/m²) | $\gamma_S^+$ (mJ/m²) | $\gamma_S^-$ (mJ/m²) | $\gamma^P$ (mJ/m²) | $\gamma_S^L$ (mJ/m²) |
|---|---|---|---|---|
| 49.33 | 2.337 | 21.06 | 14.03 | 35.3 |

TABLE 5

Lifshitz-van der Walls components electron-donor parameters determined for untreated smooth surface.

| $\gamma_S$ (mJ/m²) | $\gamma_S^+$ (mJ/m²) | $\gamma_S^-$ (mJ/m²) | $\gamma^P$ (mJ/m²) | $\gamma_S^L$ (mJ/m²) |
|---|---|---|---|---|
| 55.31 | 2.58 | 17.73 | 13.53 | 41.78 |

EXAMPLE 2

Results and Discussion

Laser texturing of yttria stabilized zirconia is carried out at high pressure nitrogen assisting gas environments. The morphological and metallurgical changes in the treated layer are examined using the analytical tools. The hydrophobicity of the resulting surface is assessed through contact angle measurements.

Figure 3A:
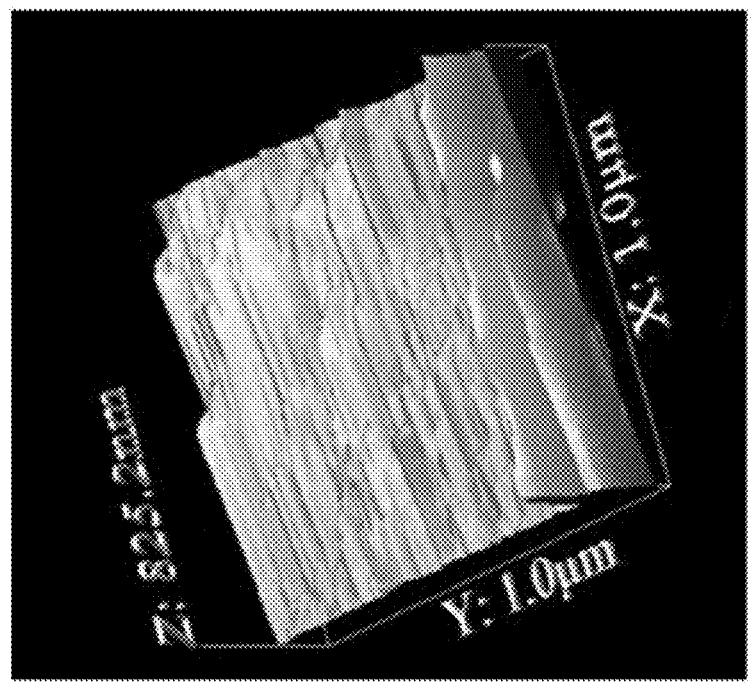
FIG. 3A is a AFM micro-image and roughness of a laser treated surface.
Figure 3B:
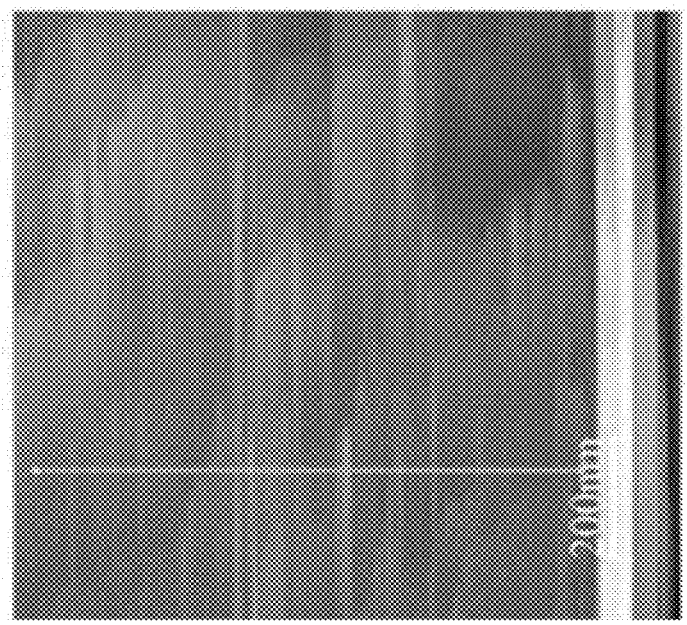
FIG. 3B is another view of a AFM micro-image and roughness of a laser treated surface.
Figure 3C:
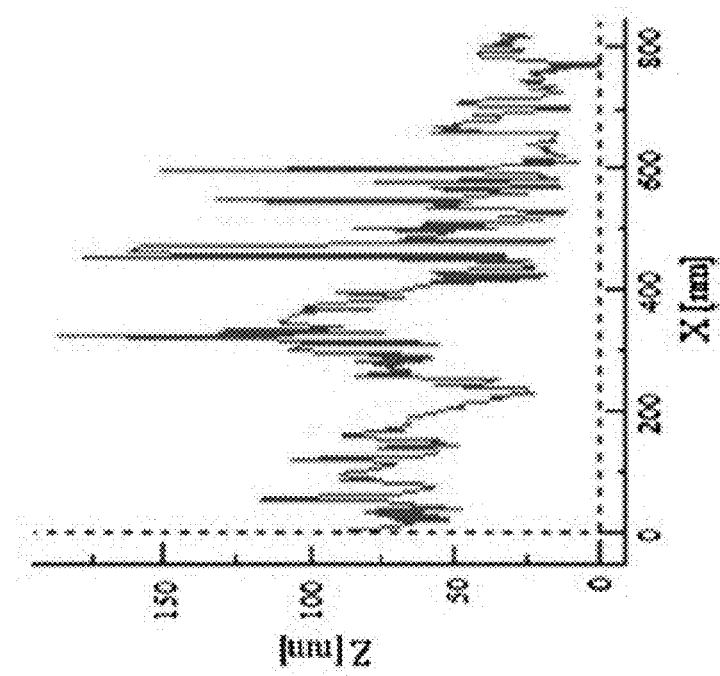
FIG. 3C is a graph of the roughness of a laser treated surface.

FIGS. 2A, 2B, 2C, 2D show scanning electron microscope micrographs of the top surface of the treated layer. The laser scanning forms regular ablated/melted tracks at the surface. Due to the repetition of the laser pulses (1500 Hz) during the processing, laser irradiated spots are overlapped at the surface during the scanning. The overlapping ratio of the spots is in the order of 72%, which provides continuous ablated/melted sites along the tracks. Since the laser power intensity and scanning speed are set such that high evaporation rate from the surface is avoided. This setting is established after carrying out several tests. The treated surface is free from large scale asperities such as large scale cracks or crack networks, pores, and cavities. In addition, no melt flow is observed across the laser scanning tracks. The treated surface composes of micron/nano sized grooves as consistent with the previous work. The roughness of the treated surface is in the order of 0.3 μm, which can be seen from FIGS. 3A, 3B, 3C, in which atomic force microscopy image is shown. The surface roughness varies along the laser scanning tracks, which is associated with the ablation of the surface during the scanning. In this case, laser beam partially impinges onto previously formed cavity and partially onto the neighboring untreated surface along the scanning direction. Since the overlapping ratio is high, the area where the laser intensity incident onto the untreated neighboring surface becomes larger than that corresponding to the initially formed cavity surface. Therefore, laser intensity remains high on the untreated neighboring surface than that of the initially formed cavity surface because of the Gaussian intensity distribution of the incident laser beam. Low intensity causes partial melting of the initially formed cavity surface while modifying surface texture and altering the surface roughness along the scanning tracks. The micro sized cavities are few and they are randomly distributed at the surface. The formation of micro sized cavities can be explained in terms of the thermal agitation of the surface plasma at the irradiated surface. In this case, evaporated front absorbs the incident laser energy and forms small surface plasma, which is transiently hot. See B. S. Yilbas, R. Davies, A. Gorur, Z. Yilbas, F. Begh, N. Akcakoyun, M.

Kalkat, Investigation into development of liquid layer and formation of surface plasma during $CO_2$ laser cutting process. Proc., Instn. Mech. Eng. Part B: J. Eng. Manuf. 206 (1992) 287-298, incorporated herein by reference in its entirety. The surface plasma acts like an additional heat source at the surface while increasing the cavity size during the ablation.

Figure 4A:
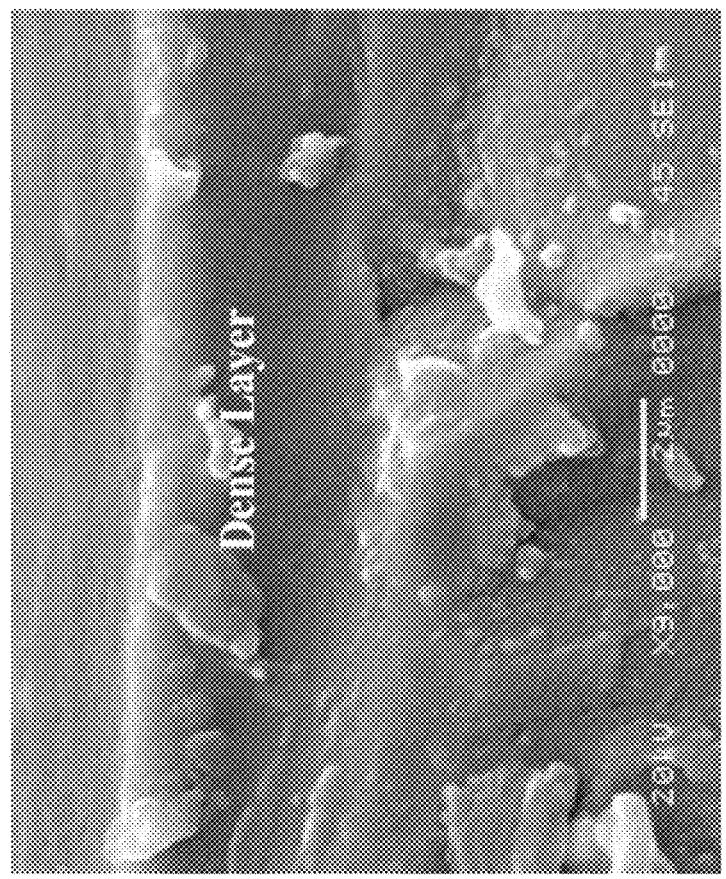
FIG. 4A is a SEM micrograph of cross-section of a laser treated layer with a dense layer formed at the surface vicinity.
Figure 4B:
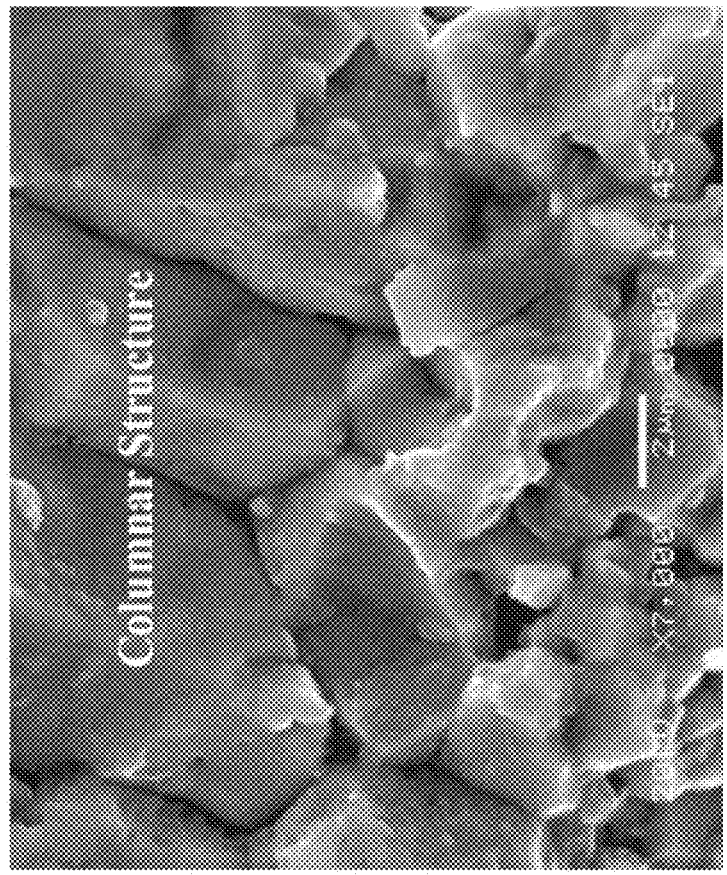
FIG. 4B is a SEM micrograph of cross-section of a laser treated layer with a columnar structure formed below the surface
Figure 4C:
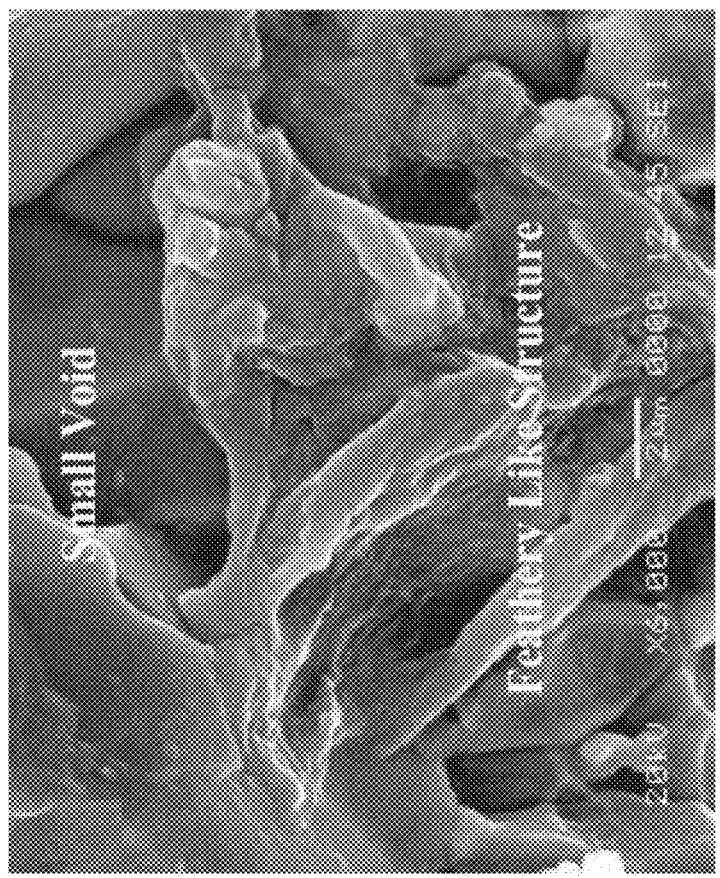
FIG. 4C is a SEM micrograph of cross-section of a laser treated layer with a feathery-like structure in the treated layer.

FIGS. 4A, 4B, 4C show scanning electron microscope micrographs of the cross-section of the laser treated layer. Laser treatment results in dense layer at the surface because of the high cooling rates in this region. The dense layer consists of fine grains and closely spaced fine dendrites forming a feathery-like structure in this region. The surface layer has higher density than that of the untreated substrate below the dense layer, which causes volume shrinkage in the surface region. This, in turn, causes some small size voids to be formed below the dense layer. However, the voids are small and few in numbers in the treated layer. As the depth below the surface increases, slightly longer and larger columnar structures are formed. This is attributed to the relatively lower cooling rates taking place in this region as compared to that in the surface region. Micro-cracks are not observed in the dense layer and in the large columnar region despite the occurrence of high cooling rates at the workpiece surface. This is because of the self-annealing effect of the lately formed laser scanning tracks. In this case, lately formed tracks act as heat source to initially formed tracks while generating a self-annealing effect on the previously formed tracks. The heat affected zone is not observable at the interface of the laser treated layer and the base material, which is associated with the low thermal conductivity of zirconia.

Figure 7:
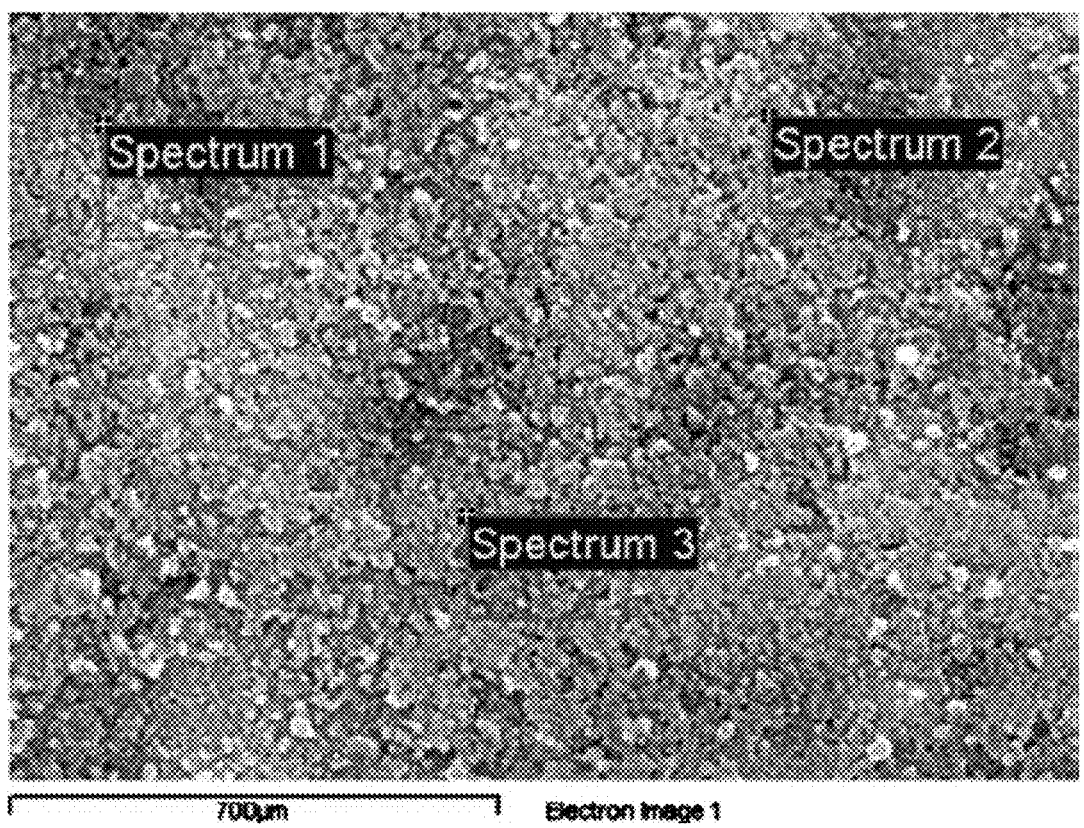
FIG. 7 is an image of different spectra taken for a sample for elemental composition analysis with EDS.

FIGS. 5A and 5B show XRD diffractograms of the laser treated and as received surfaces. As-received material comprises of tetragonal $ZrO_2$ (t-$ZrO_2$). The presence of ZrN peaks are observed from the diffractogram for the laser treated surface. The use of nitrogen at pressure is responsible for the formation of ZrN compound at the surface. However, ZrN compound is formed through two steps process. Firstly, the transformation of tetragonal structure of zirconia (t-$ZrO_2$) into cubic zirconia (c-$ZrO_2$), which takes place at high temperatures at the surface. Secondly, oxygen release through the dissociation process, which results in formation of zirconium nitride (ZrN). Therefore, the chemical process can be outlined as: t-$ZrO_2 \rightarrow$ c-$ZrO_2$ and $2ZrO_2 + N_2 \rightarrow ZrN + O_2$. However, the reactions take place in the surface vicinity results in formation of vacancies in the zirconia, which alters the surface energy. See H. Xing, Y. Fu, C. Margam, A. W. Batchelor, X-ray imaging of laser re-melted plasma sprayed zirconia coating, J. Mater. Sci. Lett. 17 (1998) 163-165, incorporated herein by reference in its entirety. Elemental composition across the treated surface remains almost uniform, which can be observed from Table 6, in which the EDS data obtained from the laser treated surface are given along with corresponding spectrum in FIG. 7. Although the quantification of light elements, such as nitrogen, from the EDS data involves error, the presence of nitrogen is evident from the EDS data. This agrees with the presence of ZrN peaks in the XRD diffractogram. However, due to the unavailability of the WDS (wavelength dispersive X-ray spectroscopy) facility in our laboratory, the accurate elemental analysis is not presented and left for the future study. Table 2 gives the microhardness and fracture toughness of the laser treated and as received surface. It is evident that the laser treatment improves the microhardness at the surface; however, fracture toughness reduces because of the microhardness enhancement at the surface. The formation of a dense layer, feathery-like structures and presence of ZrN compound in the surface vicinity are responsible for the microhardness enhancement at the surface. The residual stress predicted is compressive and it is in the order of 1.6±0.05 GPa.

TABLE 6

EDS data far elemental composition of laser treated workplace surface (wt %).

| Spectrum | Y | N | O | Zr |
|---|---|---|---|---|
| Spectrum 1 | 5 | 4 | 46 | Balance |
| Spectrum 2 | 6 | 5 | 44 | Balance |
| Spectrum 3 | 6 | 5 | 45 | Balance |

Figure 6A:
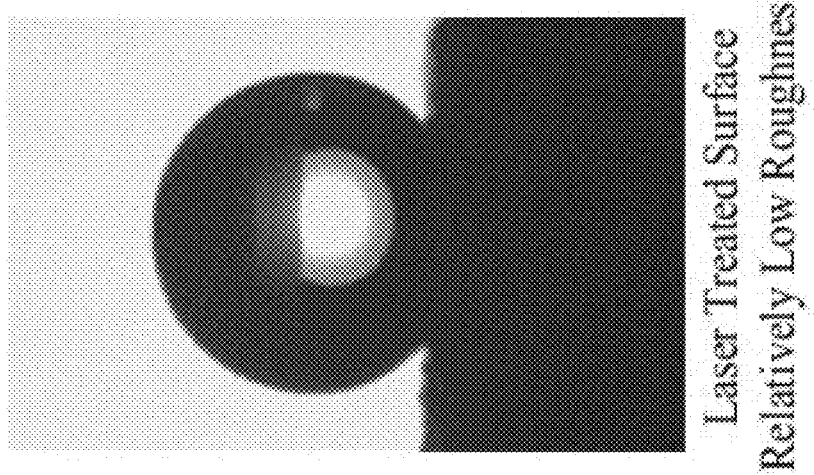
FIG. 6A is a microimage of a water droplet on a sample surface that has been laser treated with relatively low roughness.
Figure 6B:
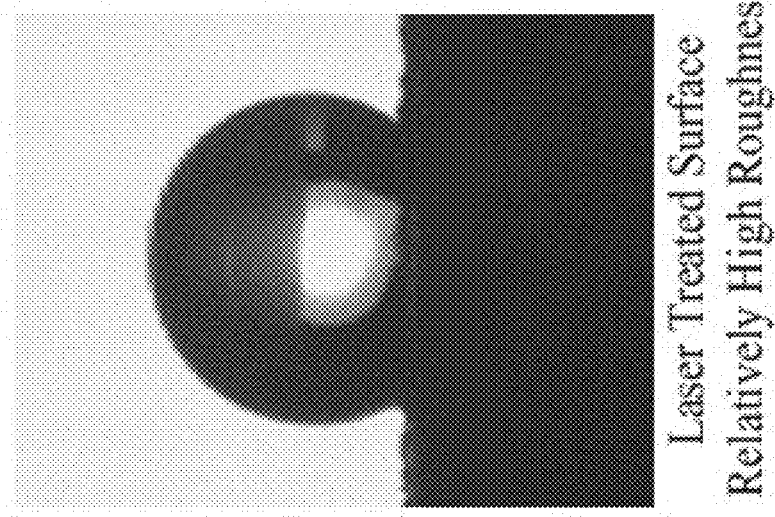
FIG. 6B is a microimage of a water droplet on a sample surface that has been laser treated with relatively high roughness.
Figure 6C:
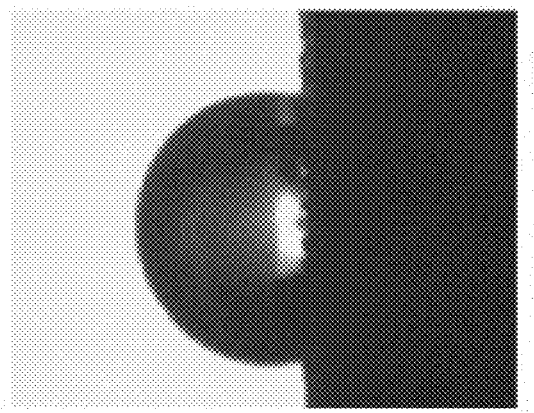
FIG. 6C is a microimage of a water droplet on an as received sample surface with relatively high roughness.

FIGS. 6A, 6B, 6C show images obtained from the contact angle measurements and Table 7 gives the contact angles measured at different locations on the surface. The surface texture and surface energy influence the wetting properties of the surface. See S. He, M. Zheng, L. Yao, X. Yuan, M. Li, L. Ma, W. Shen, Preparation and properties of ZnO nanostructures by electrochemical anodization method. Appl. Surf. Sci. 256 (8) (2010) 2557-2562, incorporated herein by reference in its entirety. Since the surface texture composes of micro/nano grooves, the wetting state varies across the surface. In addition, formation of ZrN at the surface alters the wetting state due to modification of the surface energy; in which case surface energy of laser treated reduces due to formation of ZrN. See C.-C. Sun, S.-C, Lee, W.-C. Hwang, J.-S. Hwang, I.-T. Tang, Y.-S. Fu, Surface free energy of alloy nitride coatings deposited using closed field unbalanced magnetron sputter ion plating, Mater. Trans. 47 (10) (2006) 2533-2539, incorporated herein by reference in its entirety. In the present study, the surface energy of laser treated workpieces is measured as 49.33 $mJ/m^2$, which is very close to finding of the previous study (52.6 $mJ/m^2$) for ZrN. In addition, the surface energy of as received (untreated) workpiece is measured as 55.31 $mJ/m^2$, which is in agreement with the data reported in the previous study (56.1) for zirconia. Consequently, laser treatment reduces the surface energy of the workpiece while contributing to surface hydrophobicity increase. Moreover, the combined wetting states can be explained through the Laplace pressure. In the case of nano sized texturing, having a heterogeneous interface, confining the water at the air/water interface takes place. The Laplace pressure can be expressed as:

$$\Delta P = -\frac{2\gamma \cos(\theta - \alpha)}{d_o + h \tan \alpha} \quad (8)$$

where y is the surface tension of water, θ is the contact angle, a is the inclination angle, h is the height of the groove, $d_o$ is the groove width, and $\Delta P = P - P_o$ (P is the pressure in the liquid of the meniscus and $P_o$ is the ambient pressure). Increasing Laplace pressure allows more air to be trapped in the groove, which in turn prevents the droplet meniscus touching the bottom surface of the groove while causing increased contact angle. The Laplace pressure estimated varies at the laser treated surface because of combined micro/nano textures. The Laplace pressure estimated is in the range of $0.9 \times 10^4$ to $0.1 \times 10^4$ Pa. This indicates the presence of Cassie state, which can also be seen from the images of contact angle measurements. However, at some locations, where the micro texturing is dominant, the Laplace pressure calculations loss its meaning and water meniscus touches the treated surface. Wenzel state dominates in this region and the contact angle reduces, which can be seen from the image in FIGS. 6A, 6B, 6C. Moreover, the contact angle due to a rough surface can be associated with that of the smooth surface through an equation:

$$\cos \theta = f_1(R_1 \cos \theta + 1) - 1 \qquad (9)$$

where $f_1$ is the fraction of the solid-liquid interface under the droplet and $f_1=1$ for homogeneous interface (without presence of air gab), $R_1$ is the roughness factor of the surface, which is equal to the ratio of the total surface area to its flat projection, and h is the contact angle. Since the laser treated surface contains nano and micro sized textures, according to Eq. (3), the solid-liquid interface factor ($f_1$) should be within $0 \leq f_1 \leq 1$. Consequently, composite surface texture with the combination of micro/nano grooves results in two state of hydrophobicity at the treated surface, which can be seen from FIGS. 6A and 6B. Since the droplet angle measurements repeated at nine locations at the treated surface, seven locations prevails the presence of Cassie state and 2 locations are in Wenzel state; therefore, Cassie state dominates over Wenzel state. It can also be observed from the photographs that in the first case (rough surface), Wenzel state takes place; therefore, the water droplet penetrates into the grooves and touches the surface without presence of the air gab.

TABLE 7

Contact angles measurement results prior to and after the laser treatment using water, glycerol, and diiodomethane.

| | Contact angle (Degrees) | | | | | |
|---|---|---|---|---|---|---|
| | Water | | Glycerol | | Diiodomethane | |
| | Low roughness | High roughness | Low roughness | High toughness | Low roughness | High roughness |
| Untreated | 51.1 ± 5 | | 36.2 ± 5 | | 20.5 ± 5 | |
| Laser treated | 121.4 ± 5 | 98.8 ± 5 | 114.6 | 93.4 | 41.1 | 40.2 |

Conclusion

Laser gas assisted ablation of yttria stabilized zirconia surface is carried out to enhance the surface hydrophobicity. Morphological and metallurgical changes in the laser treated layer are examined by using scanning electron and atonic force microscopies, energy dispersive spectroscopy, and X-ray diffraction. The microhardness and the fracture toughness of the treated surface are measured incorporating the indentation tests. The residual stress at the treated surface is determined from the X-ray diffraction data. The state of surface hydrophobicity is assessed through the contact angle measurements. It is found that the treated surface is free from large size cracks and cavities and the surface texture composes of fine grooves. The surface roughness was well altered by the laser processing with the maximum surface roughness generated to be on the order of 0.35 µm. This, in turn, modifies the wetting state of the surface, provided that Cassie state dominates over Wenzel state at the treated surface. In addition, formation of ZrN modifies the surface energy while contributing to the hydrophobicity enhancement at the surface. A dense layer consisting of fine size grains are formed at the surface. The volume shrinkage, because of the dense layer formation at the surface, causes few scattered voids below the dense layer. The treated surface is free from large scale asperities such as microcracks and crack networks, and large size pores and cavities.

The use of high pressure nitrogen assisting gas during the processing resulted in the formation of ZrN compounds at the surface. Laser treatment increased the microhardness and lowered the fracture toughness of the surface. The measured decrease in the fracture toughness was associated with the microhardness enhancement at the surface. The residual stress measured from the X-ray diffraction data is in the order of −1.6±0.05 GPa, which is compressive.

The invention claimed is:

1. A method of treating a ceramic surface comprising zirconia, the method comprising:
    ablating the ceramic surface by directing a laser beam with a diameter of 200-400 µm produced by a $CO_2$ laser with a pulse frequency of 1200-1800 Hz onto the ceramic surface; and
    concurrently exposing the ceramic surface to a $N_2$ assist gas with a pressure of 550-650 KPa to form an ablated ceramic surface comprising microgrooves with ZrN present on a surface of the microgrooves, wherein the $N_2$ assist gas and the laser beam are oriented co-axially;
    wherein the ceramic surface is not pretreated with particles selected from the group consisting of TiC and $B_4C$ prior to the ablating;
    wherein the ablated ceramic surface has a Vickers hardness of 19.2-23 GPa; and
    wherein the ablated ceramic surface has a higher surface hydrophobicity than the ceramic surface prior to the ablating.

2. The method of claim 1, wherein the ceramic surface comprises yttria stabilized zirconia.

3. The method of claim 1, wherein the ceramic surface is ablated with a laser beam having a power ranging from 1.5-2.5 kW.

4. The method of claim 1, wherein the ceramic surface is ablated with a laser beam with a scanning speed ranging from 7-13 cm·s$^{-1}$.

5. The method of claim 1, wherein the ceramic surface is ablated with a laser beam penetration depth of 3-8 µm.

6. The method of claim 1, wherein the ablated ceramic surface has a surface roughness ranging from 0.25-0.35 µm when measured on a 1 µm×1 µm area.

7. The method of claim 1, wherein the microgrooves have an average width of 40-60 µm and an average distance between the microgrooves is 20-30 µm.

8. The method of claim 1, wherein the ablated ceramic surface has a surface energy of 40-55 mJ/m$^2$.

9. The method of claim 1, wherein the ablated ceramic surface has an average water droplet contact angle of 98-121.4°.

10. The method of claim 1, which increases the surface hydrophobicity of the ceramic surface by at least 100% relative to a ceramic surface that is not treated by the ablating and the concurrently exposing as measured by an average water droplet contact angle.

11. The method of claim 1, wherein the ablated ceramic surface has an average glycerol droplet contact angle of 93-120°.

12. The method of claim 1, wherein the ablated ceramic surface has an average diiodomethane droplet contact angle of 35-45°.

13. The method of claim 1, wherein the ablated ceramic surface has a Vickers hardness of 19.2 GPa.

14. The method of claim 1, wherein the ablated ceramic surface has a residual stress of −1.7 to −1.5 GPa.

15. The method of claim 1, wherein the ablated ceramic surface has a fracture toughness of 6.5-9.0 MPa·√m.

16. The method of claim 1, wherein the ceramic surface is not pretreated with a film, a resin, nanostructures, or any combination thereof prior to the ablating.

17. The method of claim 1, further comprising coating the ablated ceramic surface with a hydrophobic layer to form a superhydrophobic ceramic surface.

18. The method of claim 17, wherein the hydrophobic layer comprises at least one selected from the group consisting of a fluorocarbon, a perfluorocarbon, a resin, a hydrophobic fatty acid, and a hydrophobic self-assembled monolayer.

19. A method of treating a yttria stabilized zirconia surface, comprising:
 ablating the yttria stabilized zirconia surface by directing a laser beam produced by a laser with a pulse frequency of 1200-1800 Hz onto the yttria stabilized zirconia surface; and
 concurrently exposing the yttria stabilized zirconia surface to a $N_2$ assist gas with a pressure of 550-650 KPa to form an ablated yttria stabilized zirconia surface comprising microgrooves with ZrN present on a surface of the microgrooves, wherein the $N_2$ assist gas and the laser beam are oriented co-axially;
 wherein the yttria stabilized zirconia surface is not pretreated with particles selected from the group consisting of TiC and $B_4C$ prior to the ablating;
 wherein the ablated yttria stabilized zirconia surface has a surface hydrophobicity that is at least 100% higher than a yttria stabilized zirconia surface that is not treated by the ablating and the concurrently exposing as measured by an average water droplet contact angle; and
 wherein the ablated yttria stabilized zirconia surface has a Vickers hardness of 19.2-23 GPa.

20. A method of treating a yttria stabilized zirconia surface, comprising:
 ablating the yttria stabilized zirconia surface by directing a laser beam produced by a $CO_2$ laser with a pulse frequency of 1200-1800 Hz onto the yttria stabilized zirconia surface; and
 concurrently exposing the yttria stabilized zirconia surface to a $N_2$ assist gas with a pressure of 550-650 KPa to form an ablated yttria stabilized zirconia surface comprising microgrooves with ZrN present on a surface of the microgrooves, wherein the $N_2$ assist gas and the laser beam are oriented co-axially;
 wherein the ablated yttria stabilized zirconia surface has a Vickers hardness of 19.2-23 GPa;
 wherein the ablated yttria stabilized zirconia surface has a higher surface hydrophobicity than the yttria stabilized zirconia surface; and
 wherein the yttria stabilized zirconia is not pretreated with particles selected from the group consisting of TiC and $B_4C$, a film, a resin, nanostructures, or any combination thereof prior to the ablating.

* * * * *